United States Patent
Tabuchi

(10) Patent No.: US 7,340,742 B2
(45) Date of Patent: Mar. 4, 2008

(54) PRIORITY EXECUTION CONTROL METHOD IN INFORMATION PROCESSING SYSTEM, APPARATUS THEREFOR, AND PROGRAM

(75) Inventor: Masahiro Tabuchi, Tokyo (JP)

(73) Assignee: NEC Corporation, Tokyo (JP)

(*) Notice: Subject to any disclaimer, the term of this patent is extended or adjusted under 35 U.S.C. 154(b) by 598 days.

(21) Appl. No.: 10/218,424

(22) Filed: Aug. 15, 2002

(65) Prior Publication Data

US 2003/0037117 A1 Feb. 20, 2003

(30) Foreign Application Priority Data

Aug. 16, 2001 (JP) .............................. 2001-247157

(51) Int. Cl.
  G06F 9/46 (2006.01)
  G06F 15/16 (2006.01)
(52) U.S. Cl. ...................... 718/103; 719/313; 719/314; 709/203; 709/227; 709/229
(58) Field of Classification Search ........ 718/100–108; 709/103, 227–229, 203; 710/305; 711/112; 719/313–314
See application file for complete search history.

(56) References Cited

U.S. PATENT DOCUMENTS

| | | | | |
|---|---|---|---|---|
| 5,592,671 A * | 1/1997 | Hirayama | .................... | 718/104 |
| 5,826,081 A * | 10/1998 | Zolnowsky | .................. | 718/103 |
| 5,928,322 A * | 7/1999 | Bitar et al. | .................. | 718/103 |
| 6,006,269 A * | 12/1999 | Phaal | .......................... | 709/227 |
| 6,378,036 B2 * | 4/2002 | Lerman et al. | ............. | 711/112 |
| 6,473,780 B1 * | 10/2002 | Barcelo | ........................ | 718/103 |
| 6,513,057 B1 * | 1/2003 | McCrory | ..................... | 718/102 |
| 6,542,921 B1 * | 4/2003 | Sager | ........................... | 718/108 |
| 6,560,628 B1 * | 5/2003 | Murata | ......................... | 718/103 |
| 6,675,191 B1 * | 1/2004 | Ito | ............................... | 718/102 |
| 6,763,520 B1 * | 7/2004 | Seeds | ........................... | 718/101 |
| 6,779,182 B1 * | 8/2004 | Zolnowsky | .................. | 718/103 |
| 6,848,107 B1 * | 1/2005 | Komine et al. | ............. | 719/314 |
| 7,000,055 B1 * | 2/2006 | Robins et al. | ............... | 710/305 |
| 2003/0009505 A1 * | 1/2003 | Cuomo et al. | .............. | 709/103 |

FOREIGN PATENT DOCUMENTS

JP 4-176236 A 6/1992

(Continued)

OTHER PUBLICATIONS

Bhatti et al, "Web Server Support for Tiered Service", IEEE Network, Sep. 1999; pp. 64-71.*

(Continued)

Primary Examiner—Meng-Al T. An
Assistant Examiner—Jennifer N. To
(74) Attorney, Agent, or Firm—Sughrue Mion, PLLC

(57) ABSTRACT

In a priority execution control method in an information processing system, a processing request is stored in either of a priority queue and a normal queue in accordance with the processing priority. A processing request stored in the priority queue is extracted and processed by a priority processor which dedicatedly processes a processing request stored in the priority queue. A processing request stored in the normal queue is extracted and processed by a normal processor which dedicatedly processes a processing request stored in the normal queue. A priority execution control apparatus and computer-readable recording medium are also disclosed.

25 Claims, 12 Drawing Sheets

FOREIGN PATENT DOCUMENTS

JP           9-34730 A     2/1997
JP           11-237993 A    8/1999

OTHER PUBLICATIONS

HP WEBQOS, "HP WEBQOS Technology Overview", Nov. 1999; pp. 1-7.*

Kenjiro, "Method and Device for Controlling Task Priority", Japanese Publication H11-237993, translation, pp. 1-26.*

Hiromi et al., "Distributed Processing Method and Distributed Processor for the same", Japanese Publication H09-034730, translation, pp. 1-26.*

OpenTPI Version 5—Distributed transaction processing functions—OpenTPI—Explanation—Instructions—Common Manual, 4th Edition, Hitachi Ltd., Mar. 31, 2001, 4th Edition, p. 102.

* cited by examiner

PRIORITY EXECUTION CONTROL METHOD IN INFORMATION PROCESSING SYSTEM, APPARATUS THEREFOR, AND PROGRAM

BACKGROUND OF THE INVENTION

The present invention relates to a priority execution control method capable of processing as quick as possible a processing request which should be preferentially processed among a plurality of processing requests output from an application program, and an apparatus therefor.

Queues are generally used to absorb the difference between the processing request occurrence frequency per unit time and the processing amount per unit time in an information processing system. As shown in FIG. 17A, a plurality of processing requests 1102 generated in time-series from a processing request source 1101 such as an application program are temporarily stored in a queue 1103.

After the processing requests 1102 are stored in the queue 1103, a processor 1104 reads out one processing request 1102 from the queue 1103 in accordance with a FIFO (First-In First-Out) method. The processor 1104 performs processing in accordance with the contents of the processing request 1102, and outputs a processing result 1105. If another processing request 1102 remains in the queue 1103 after one processing request 1102 is processed, the processor 1104 similarly reads out the processing request 1102 and performs processing.

In FIG. 17A, the processing requests 1102 are sequentially processed in the generation order, and a specific processing request cannot be processed in preference to other processing requests. To preferentially execute a specific processing request, not a single queue but two, priority and normal queues are generally used. As shown in FIG. 17B, processing requests 1102 generated by the processing request source 1101 such as an application program are distributed to a priority queue 1107 and normal queue 1108 by a distributor 1106 in accordance with the processing priority.

The processor 1104 reads out the processing requests 1102 from the priority queue 1107 and normal queue 1108 in accordance with a predetermined rule, processes the processing requests 1102, and outputs processing results 1105. Assume that the predetermined rule is a rule that when a processing request exists in the priority queue 1107, the processing request is read out from the priority queue 1107, and only when no processing request exists, a processing request is read out from the normal queue 1108. In this case, a high-priority processing request 1102 stored in the priority queue 1107 is processed in preference to a processing request 1102 stored in the normal queue 1108.

A conventional priority execution control method using two, priority and normal queues is disclosed in Japanese Patent Laid-Open No. 4-176236 (reference 1). Reference 1 discloses a facsimile apparatus in which transmission data to which either normal or priority transmission is designated is stored in a priority or normal queue in accordance with the designation, transmission data is read out from the priority or normal queue in accordance with a preset ratio between priority communication and normal communication, and the transmission data is transmitted.

A similar priority execution control method is also adopted when a specific packet (e.g., audio packet) is preferentially transmitted by distributing the packet to a priority or normal queue in accordance with head information of the packet for the purpose of QoS (Quality of Service) in the path control apparatus of a packet communication network.

As a method of improving the performance of an information processing system, parallel processing is proposed. However, there is no application of the parallel processing technique to the priority execution control method using two, priority and normal queues. However, parallel operation of the processor 1104 shown in FIG. 17B would be achieved by an arrangement as shown in FIG. 17C. In FIG. 17C, processors 1104A and 1104B have the same function as that of the processor 1104 shown in FIG. 17B. That is, the processors 1104A and 1104B read out processing requests 1102 from the priority queue 1107 and normal queue 1108 in accordance with a predetermined rule, process the processing requests 1102, and output processing results 1105. Since processing means for processing the processing request 1102 operate parallel to each other, the processing amount per unit time increases in the information processing system.

In the priority execution control method shown in FIG. 17B, the probability of extracting the processing request 1102 from the priority queue 1107 is set higher than the probability of extracting the processing request 1102 from the normal queue 1108. A high-priority processing request 1102 stored in the priority queue 1107 can be processed in preference to a processing request 1102 stored in the normal queue 1108.

The following problem, however, arises when the priority queue 1107 is free and the normal queue 1108 stores one or more processing requests 1102. That is, if a high-priority processing request is stored in the priority queue 1107 after the processor 1104 extracts one processing request 1102 from the normal queue 1108 and starts processing, the high-priority processing request is not processed as quick as possible.

In this case, the problem cannot be solved by applying a top priority rule that when a processing request exists in the priority queue 1107, the processing request is read out from the priority queue 1107, and only when no processing request exists, a processing request is read out from the normal queue 1108. This is because when a high-priority processing request is stored in the priority queue 1107, the processor 1104 has executed a processing request extracted from the normal queue 1108, and cannot extract the processing request from the priority queue 1107 unless the current processing ends.

The same problem also occurs in an arrangement in which processors are arranged parallel to each other, as shown in FIG. 17C. If a high-priority processing request is stored in the blank priority queue 1107 while the processors 1104A and 1104B process one processing request 1102 from the normal queue 1108, the high-priority processing request is not processed until either of the processors 1104A and 1104B ends the processing of the current processing request.

SUMMARY OF THE INVENTION

It is an object of the present invention to provide a priority execution control method capable of processing as quickly as possible a processing request which should be preferentially processed, and an apparatus therefor.

To achieve the above object, according to the present invention, there is provided a priority execution control method in an information processing system, comprising the steps of storing a processing request in either of a priority queue and a normal queue in accordance with processing priority, extracting and processing a processing request stored in the priority queue, by a priority processor which dedicatedly processes a processing request stored in the priority queue, and extracting and processing a processing request stored in the normal queue, by a normal processor which dedicatedly processes a processing request stored in the normal queue.

DESCRIPTION OF THE PREFERRED EMBODIMENTS

The present invention will be described in detail below with reference to the accompanying drawings.

Figure 1:
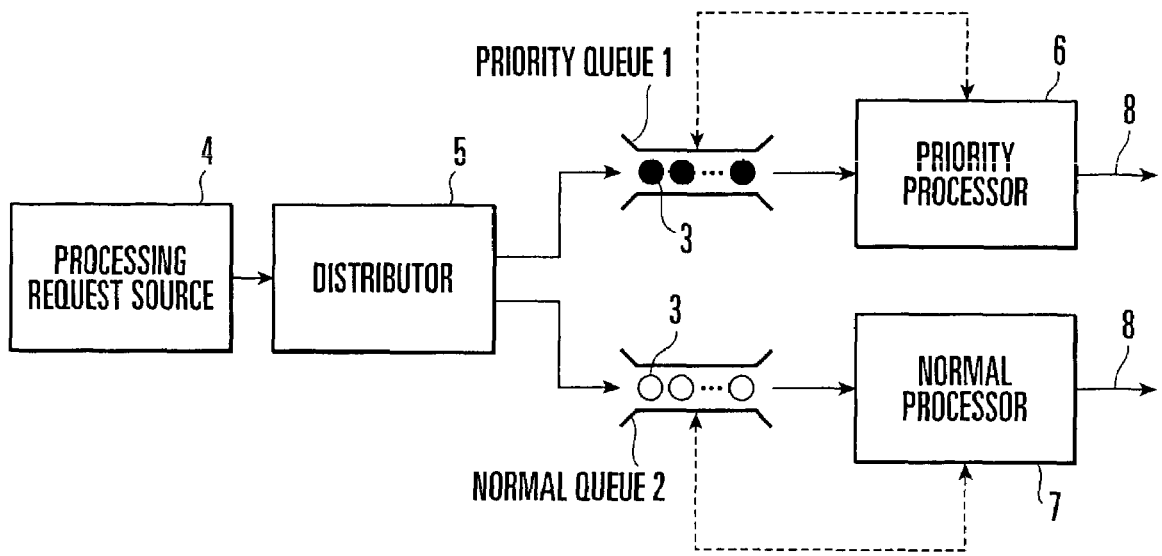
FIG. 1 is a block diagram showing a priority execution control apparatus in an information processing system for explaining the principle of the present invention.

The principle of an information processing system according to the present invention will be explained with reference to FIG. 1. The information processing system shown in FIG. 1 is constituted by two, priority and normal queues 1 and 2, a processing request source 4 such as an application program which generates a processing request 3, a distributor 5 which distributes the processing request 3 generated by the processing request source 4 to either the priority queue 1 or normal queue 2 in accordance with the processing priority, a priority processor 6 which is arranged in correspondence with the priority queue 1 and dedicatedly processes the processing request 3 stored in the priority queue 1, and a normal processor 7 which is arranged in correspondence with the normal queue 2 and dedicatedly processes a processing request stored in the normal queue 2.

The processing request 3 is a unit which requests one complete process, and contains data to be processed and sometimes the type of process. For example, the processing request 3 contains target calculation data for performing a given calculation, data for updating a database, or a program described by an interpreter language such as Jave or Java script.

The priority and normal processors 6 and 7 have the same function, and can process all the types of processing requests 3. Processes in the priority and normal processors 6 and 7 include a process of performing a predetermined calculation by using target calculation data contained in the processing request 3 and outputting the result, a process of updating a database in accordance with the designation of the processing request 3, and a process of interpreting and executing a program described by an interpreter language.

A method of distributing the processing request 3 generated by the processing request source 4 to the priority queue 1 or normal queue 2 by the distributor 5 on the basis of the processing priority is arbitrary. For example, when generating the processing request 3, the processing request source 4 adds a priority. The distributor 5 analyzes the priority added to the processing request 3, and stores a high-priority processing request 3 in the priority queue 1 and a low-priority processing request 3 in the normal queue 2.

As another example, when a plurality of processing request sources exist, a priority is given to each processing request source in advance. The distributor 5 stores a processing request 3 generated by a high-priority processing request source in the priority queue 1 and a processing request 3 generated by a low-priority processing request source in the normal queue 2. The rule used to determine the priority of a processing request by the distributor 5 may be permanently set in the distributor 5. Alternatively, a priority rule may be stored in another portion, and the distributor 5 may refer to the stored priority rule.

In the information processing system having this arrangement, each processing request 3 generated by the processing request source 4 is distributed by the distributor 5 in accordance with the processing priority such that a high-priority processing request 3 is distributed to the priority queue 1 and a low-priority processing request 3 is distributed to the normal queue 2. The priority processor 6 waits until the processing request 3 is stored in the priority queue 1. After the processing request 3 is stored in the priority queue 1, the priority processor 6 extracts and processes the processing request 3, and outputs a processing result 8. After one processing request 3 is processed, the priority processor 6 checks whether another processing request 3 exists in the priority queue 1, if so, extracts the processing request 3, and similarly processes it; otherwise, waits until another processing request 3 is stored in the priority queue 1.

To the contrary, the normal processor 7 waits until the processing request 3 is stored in the normal queue 2. After the processing request 3 is stored in the normal queue 2, the normal processor 7 extracts and processes the processing request 3, and outputs a processing result 8. After one processing request 3 is processed, the normal processor 7 checks whether another processing request 3 exists in the normal queue 2, if so, extracts the processing request 3, and similarly processes it; otherwise, waits until another processing request 3 is stored in the normal queue 2.

Figure 17A:
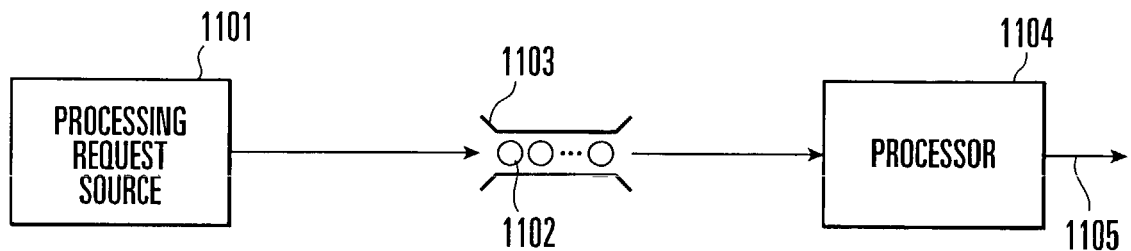
FIGS. 17A to 17C are views for explaining a conventional information processing system.
Figure 17B:
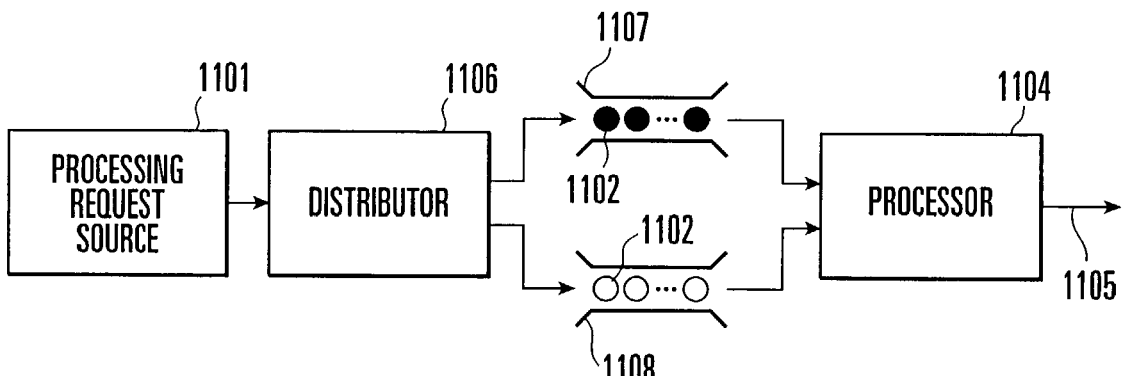
Figure 17C:
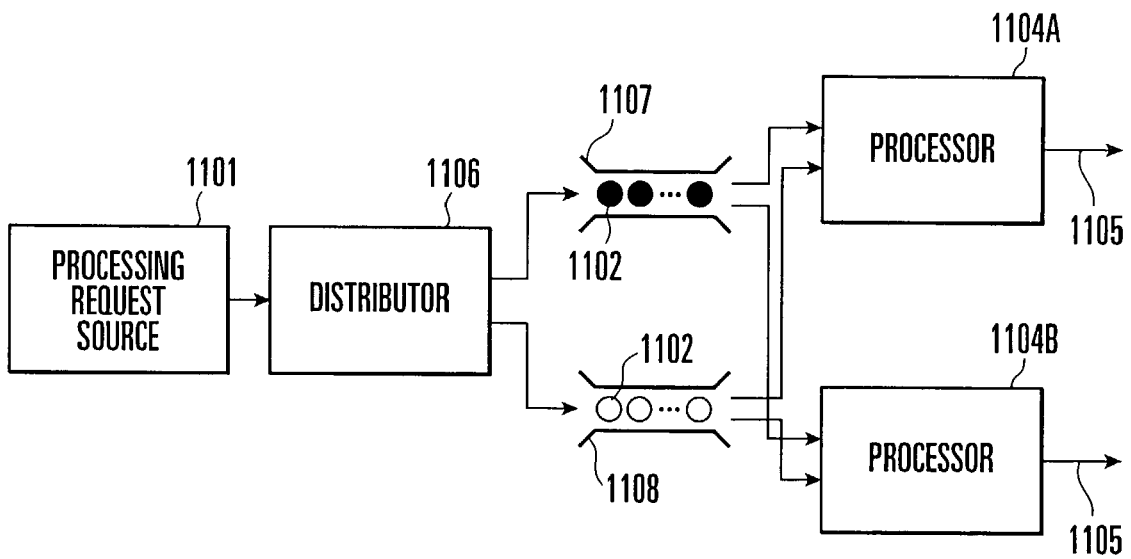

In the system shown in FIG. 1, when a plurality of processing requests are stored in the normal queue 2 while no processing request 3 is stored in the priority queue 1, only the normal processor 7 extracts a processing request from the normal queue 2 and processes the processing request. The priority processor 6 waits until the processing request 3 is stored in the priority queue 1. This is greatly different from the arrangement shown in FIG. 17C in which processors are arranged parallel to each other. When the processing request 3 is stored in the priority queue 1, the processing request 3 is extracted immediately and processed quickly by the priority processor 6.

First Embodiment

The first embodiment of the present invention will be described with reference to FIG. 2.

Figure 2:
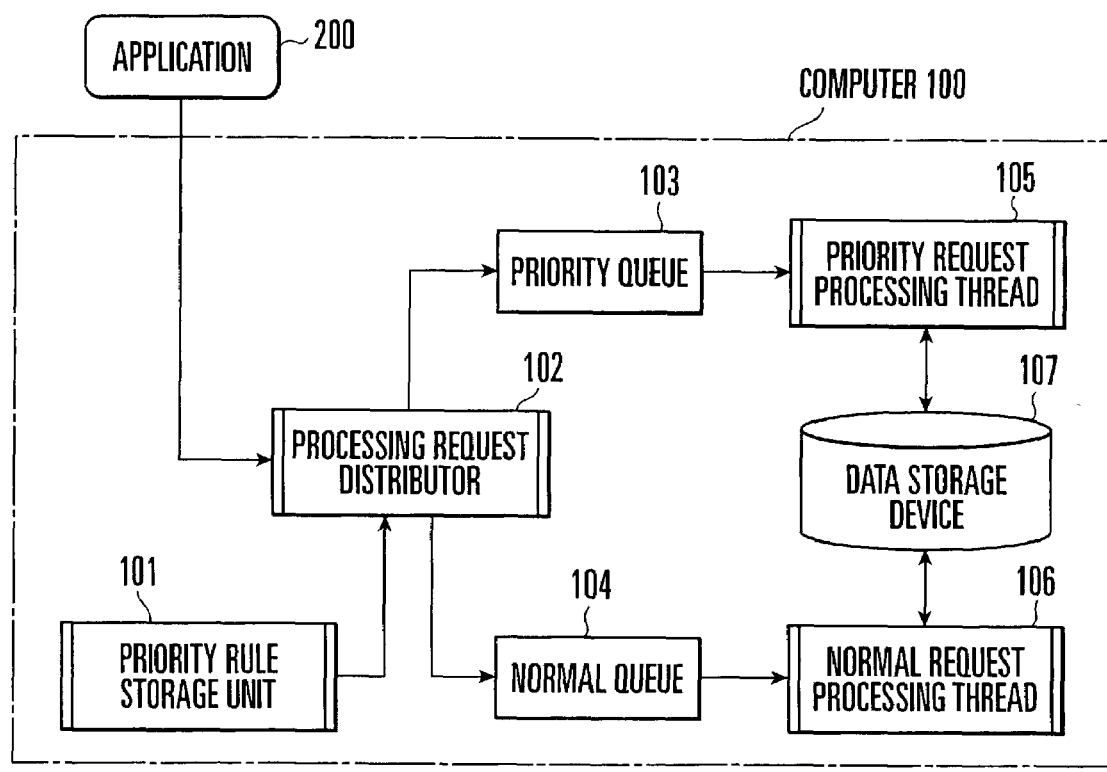
FIG. 2 is a block diagram showing an information processing system according to the first embodiment of the present invention.

In FIG. 2, a computer 100 in which a processing request (to be referred to as a priority processing request hereinafter) which should be preferentially processed among a plurality of processing requests output from an application program (client) 200 is executed in preference to processing requests (to be referred to as normal processing requests hereinafter) other than the priority processing request comprises a priority rule storage unit 101 which stores a priority rule in advance, a processing request distributor 102 which distributes processing requests output from the application program 200 in accordance with the priority rule stored in the priority rule storage unit 101, priority and normal queues 103 and 104 which temporarily store processing requests output from the processing request distributor 102, a priority request processing thread 105 which processes a processing request read out from the priority queue 103, a normal processing thread 106 which processes a processing request read out from the normal queue 104, and a data storage device 107 which is referred to and updated by the priority request processing thread 105 and normal processing thread 106 in processing.

The priority queue 103 stores by the FIFO method a priority processing request among processing requests output from the application program 200. The priority queue 103 is arranged in, e.g., a main memory. The normal queue 104 stores by the FIFO method a normal processing request among processing requests output from the application program 200. The normal queue 104 is also arranged in, e.g., the main memory.

The queue lengths of the priority and normal queues 103 and 104 may be fixed or variable. For a variable length, queue length control is desirably executed in consideration of the efficient use of a memory for the queue. For example, the queue is equipped with a PUT method and GET method in order to store a processing request in the queue and extract a processing request from the queue. When the processing request distributor 102 stores a processing request in the priority queue 103 or normal queue 104, the distributor 102 invokes the PUT method of the queue. When the priority request processing thread 105 or normal request processing thread 106 extracts a processing request from the priority queue 103 or normal queue 104, the thread 105 or 106 invokes the GET method of the queue.

In this arrangement, if the queue itself manages its queue length, the current queue length coincides with the number of stored processing requests, and the PUT method is invoked, the queue extends its queue length to allow receiving a processing request. To the contrary, if the GET method is invoked, no processing request remains, and the queue length is extended, the queue itself returns the queue length to a predetermined queue length. This queue length control can be adopted.

The priority request processing thread 105 corresponds to the priority processor 6 in FIG. 1, and is arranged in correspondence with the priority queue 103. The normal request processing thread 106 corresponds to the normal processor 7 in FIG. 1, and is arranged in correspondence with the normal queue 104. The first embodiment implements a processing system which processes a processing request by using a multithread technique. The thread is discriminated from a process in a narrow sense, but is used in a broad sense including a process in this specification. In other words, the threads 105 and 106 may be threads in a narrow sense or processes.

In the information processing system which realizes the multithread (multiprocess), a method of assigning a longer processing time of the CPU (to be referred to as a CPU time hereinafter) for a high-priority thread on the basis of the thread priority is proposed as a thread scheduling method. Assume that two, high and low priorities are set, the maximum value of the CPU time assigned to a high-priority thread per process is 2T, and the CPU time assigned to a low-priority thread per process is a half time T. A high-priority thread is assigned a CPU time twice that of a low-priority thread by a scheduling method of sequentially selecting threads from executable threads by round robin scheduling and assigning CPU times. In the first embodiment, CPU times are assigned to the priority request processing thread 105 and normal request processing thread 106 by using the scheduling method of assigning a longer CPU time to a higher-priority thread.

The thread priorities of the threads 105 and 106 are set in advance. The thread priority of the priority request processing thread 105 is desirably set higher than or equal to that of the normal request processing thread 106. Needless to say, a given effect can be obtained even by setting the thread priority of the priority request processing thread 105 lower than that of the normal request processing thread 106.

The priority request processing thread 105 and normal request processing thread 106 have the same function. The schematic processing of the two threads 105 and 106 is shown in FIG. 3.

Figure 3:
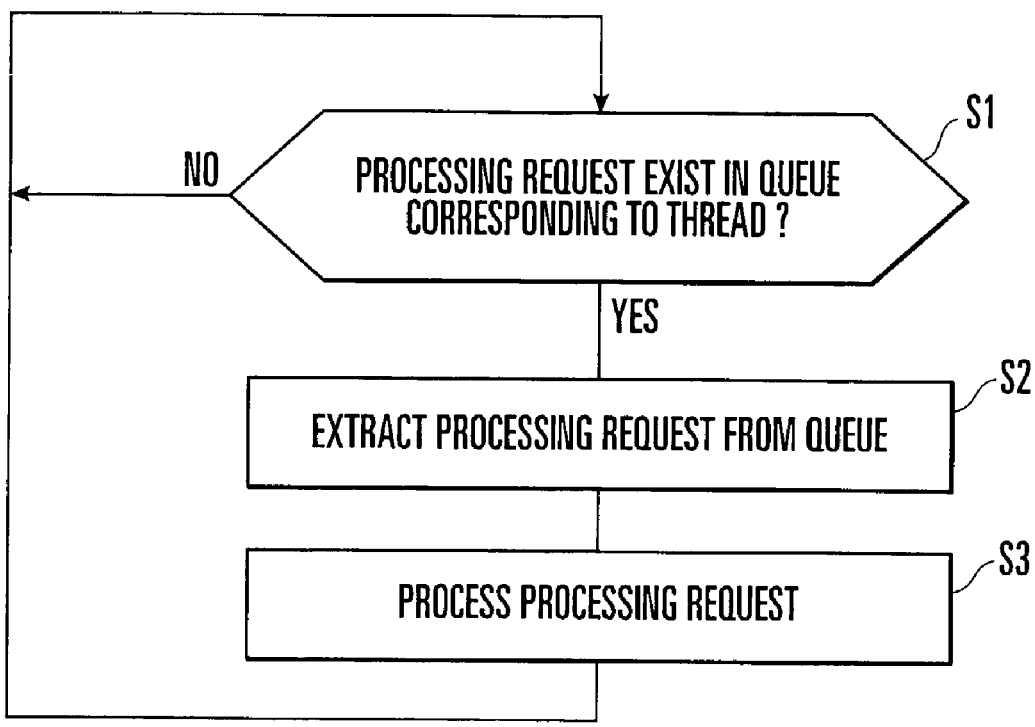
FIG. 3 is a flow chart schematically showing the processes of priority and normal request processing threads shown in FIG. 2.

Referring to FIG. 3, each of the threads 105 and 106 waits until a processing request is stored in a corresponding queue (step S1). After a processing request is stored in the corresponding queue, the thread immediately extracts the processing request from the queue (step S2), and processes the processing request (step S3). After the process of one processing request ends, the thread returns to step S1. Immediately after the next processing request is stored in the queue, the thread extracts and processes the processing request. If no processing request is stored, the thread waits until a processing request is stored.

The CPU times of the threads 105 and 106 per process are determined. If the threads 105 and 106 run out of their own times, they temporarily make the CPU free. When no processing requests are stored in corresponding queues, the threads 105 and 106 change to a sleep state and make the CPU free even with their own time left. The sleeping threads become executable when processing requests are stored in the queues.

The first embodiment assumes a processing request which requires processing of referring to/updating data stored in the data storage device 107. The threads 105 and 106 share the same data storage device 107. To update data stored in the data storage device 107, the threads 105 and 106 lock an update portion and exclusively execute update. The locking unit, i.e., exclusive unit is set as small as possible in order to sufficiently ensure the parallel property of the threads 105 and 106.

The processing request distributor 102 distributes a processing request output from the application program 200 to either the priority queue 103 or normal queue 104. A priority processing request is stored in the priority queue 103, whereas a normal processing request is stored in the normal queue 104. In this embodiment, the processing request distributor 102 determines the priority of each processing request on the basis of priority data added to the processing request and a priority rule stored in the priority rule storage unit 101, and distributes the processing request to either the queue 103 or 104 on the basis of the determination result.

Figure 4:
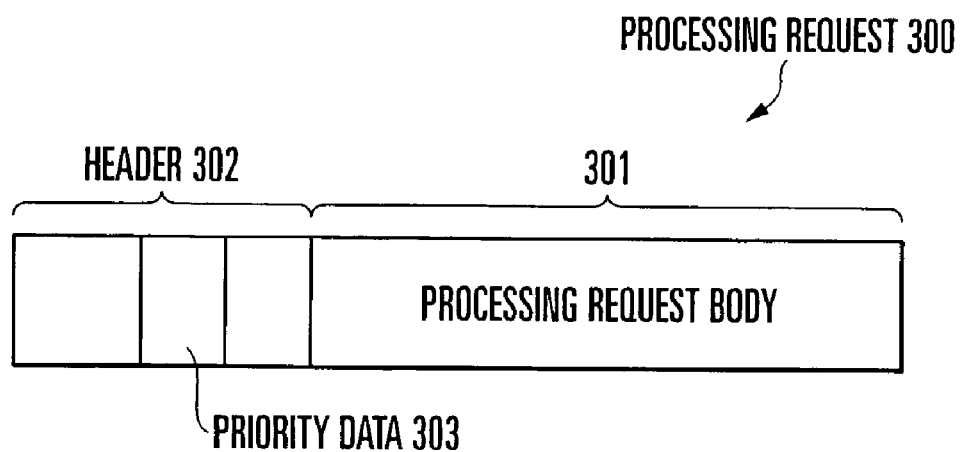
FIG. 4 is a view showing a format of a processing request.

As shown in FIG. 4, a processing request 300 is made up of a processing request body 301 and header 302. The processing request body 301 contains data to be processed. For example, the processing request body 301 contains target calculation data for performing a given calculation, an update address and update data for the data storage device 107, or a program described by an interpreter language such as Jave or Java script. When a plurality of types of processing requests are output from the application program 200, the type of processing request is set in the processing request body 301. The header 302 contains priority data 303 which numerically expresses the processing priority of the processing request 300.

In issuing a processing request, the application program 200 adds the header 302 containing the priority data 303 to the processing request body 301 to generate the processing request 300, and outputs the processing request 300 to the processing request distributor 102. The information processing system may be separately equipped with a function of generating the processing request 300 with the header 302 by using the processing request body 301 and priority data 303 upon reception of the processing request body 301 and priority data 303 from the application program 200. In this case, the application program 200 invokes this function to generate the processing request 300.

The priority rule storage unit 101 stores in advance a priority rule which determines the relationship between the value of the priority data 303 and an actual priority. For example, the priority rule prescribes a rule that the priority is set high for a positive integer value of the priority data 303 and low for a value (e.g., "0") other than a positive integer. In this case, the processing request distributor 102 stores the processing request 300 in the priority queue 103 if the value of the priority data 303 in the processing request 300 is a positive integer. If the value is not a positive integer (e.g., "0"), the processing request distributor 102 determines that the processing request 300 need not be preferentially processed, and stores it in the normal queue 104.

As another example, the priority rule prescribes a rule that the priority is set high when the priority data 303 is equal to or higher than a predetermined threshold α and low when the priority data 303 is lower than the threshold α. In this case, the processing request distributor 102 compares the value of the priority data 303 in the processing request 300 with the threshold α, and stores a processing request 300 having priority data 303 equal to or higher than the threshold α in the priority queue 103 and a processing request 300 having priority data 303 lower than the threshold α in the normal queue 104.

The operation of the information processing system having this arrangement will be explained. First, the application program 200 outputs the processing request 300 prepared by adding the priority data 303 to the header 302. Then, the processing request distributor 102 determines based on the value of the priority data 303 and the priority rule stored in the priority rule storage unit 101 whether the processing request 300 is a priority processing request. On the basis of the determination result, the processing request distributor 102 stores a priority processing request in the priority queue 103 and a normal processing request in the normal queue 104. Note that the entire processing request 300 may be stored in the queue 103 or 104 or only the processing request body 301 may be stored.

The following operation will be described with reference to FIG. 3. The normal request processing thread 106 always monitors whether the processing request 300 is stored in the normal queue 104 (step S1). If the normal request processing thread 106 detects that the processing request 300 has been stored, the thread 106 extracts the processing request 300 from the normal queue 104 (step S2). The normal request processing thread 106 processes the processing request 300 by executing a predetermined process defined in the thread 106 in advance in accordance with the contents of the processing request body 301 (step S3). As part of this processing, the data storage device 107 is updated. If another processing request 300 has already been stored in the normal queue 104 after one processing request 300 is processed, the normal request processing thread 106 repeats the operation of extracting and processing the processing request 300.

If the storage amount of processing requests 300 in the normal queue 104 exceeds the processing, amount of the normal request processing thread 106 per unit time, the processing requests 300 are gradually accumulated in the normal queue 104. Even in this situation, the priority request processing thread 105 does not process a processing request in the normal queue 104 and waits until the processing request 300 is stored in the priority queue 103. In other words, the priority request processing thread 105 always monitors whether the processing request 300 is stored in the priority queue 103 (step S1).

If the priority request processing thread 105 detects that the processing request 300 has been stored, the thread 105 extracts the processing request 300 from the priority queue 103 (step S2). The priority request processing thread 105 processes the processing request 300 by executing a predetermined process defined in the thread 105 in advance in accordance with the contents of the processing request body 301 (step S3). As part of this processing, the data storage device 107 is updated. If another processing request 300 has already been stored in the priority queue 103 after one processing request 300 is processed, the priority request processing thread 105 repeats the operation of extracting and processing the processing request 300.

Assume that processing requests have the same processing amount, and the processing amount of processing requests 300 per unit time by the priority request processing thread 105 is W. As far as the storage amount of processing requests 300 per unit time in the priority queue 103 is W or less, each processing request 300 is processed immediately after the processing request 300 is stored in the priority queue 103.

If the storage amount of processing requests 300 in the priority queue 103 exceeds W, the processing requests 300 are gradually accumulated in the priority queue 103. This processing status of processing requests in the priority queue 103 will be explained in comparison with the processing status of processing requests in the normal queue 104.

When the priority request processing thread 105 and normal request processing thread 106 have the same thread priority, the same CPU time is assigned to the priority request processing thread 105 and normal request processing thread 106. Thus, the priority request processing thread 105 and normal request processing thread 106 attain the same processing amount per unit time. To process a processing request in the priority queue 103 in preference to a processing request in the normal queue 104, the generation amount of priority processing requests per unit time must be smaller than half the generation amount of normal processing requests per unit time. The application program 200 restrictedly generates a priority processing request so as to satisfy the above condition, thereby processing a priority processing request in preference to a normal processing request.

Figure 5A:
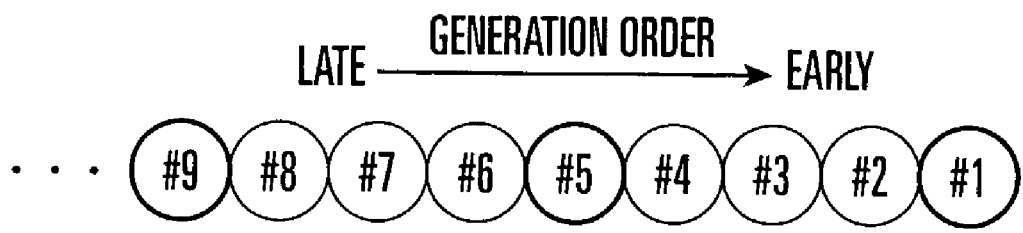
FIGS. 5A to 5C are views showing a processing status when priority and normal processing requests are generated at a ratio of 1:3.
Figure 5B:
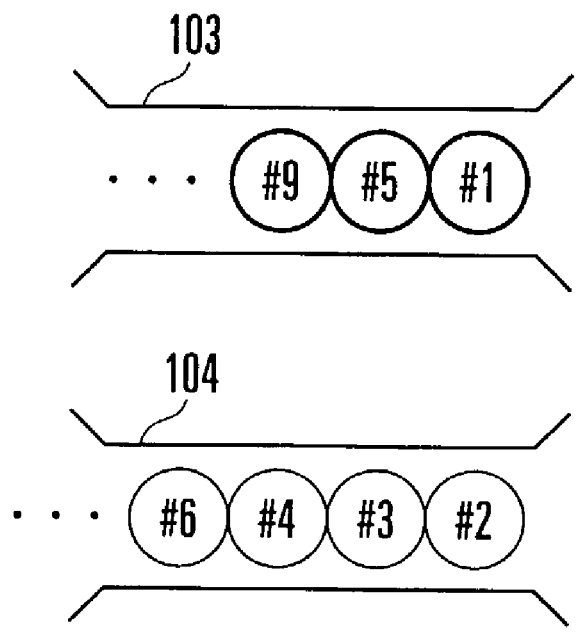
Figure 5C:
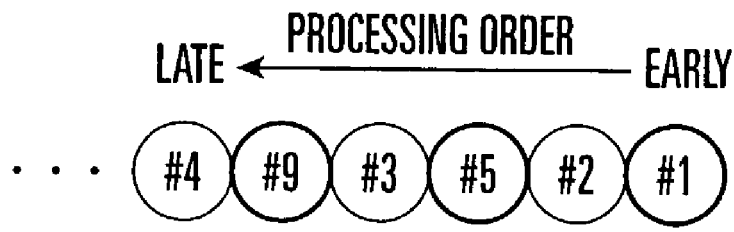

FIGS. 5A to 5C show a processing status in which priority processing requests and normal processing requests are generated at a ratio of 1:3. FIG. 5A shows the generation order of processing requests from the application program 200. Reference symbols #1, #5, and #9 denote priority processing request; and #2 to #4 and #6 to #8, normal processing requests. FIG. 5B shows the states of the priority and normal queues 103 and 104. The priority queue 103 stores the priority processing requests #1, #5, #9, and the like in the generation order. The normal queue 104 stores the normal processing requests #2 to #4, #6 to #8, and the like in the generation order.

Assuming that processing requests have the same processing amount, the priority request processing thread 105 and normal request processing thread 106 have the same processing amount per unit time, as described above. Hence, the final processing order of processing requests is as shown in FIG. 5C. The processing request #5 is processed prior to the previously generated processing requests #3 and #4. The processing request #9 is processed prior to the previously generated processing request #4 and the like. In this manner, a priority processing request is processed in preference to a normal processing request.

In a case where the thread priority of the priority request processing thread 105 is higher than that of the normal request processing thread 106, the priority request processing thread 105 is assigned a longer CPU time than that of the normal request processing thread 106. The processing amount of the priority request processing thread 105 per unit time is larger than that of the normal request processing thread 106. Unlike the case for the same thread priority, a processing request in the priority queue 103 is processed in preference to a processing request in the normal queue 104 even if the generation amount of priority processing requests per unit time is larger than half the generation amount of processing requests per unit time that need not be preferentially processed.

The ratio between the generation amount of priority processing requests per unit time and that of processing requests per unit time that need not be preferentially processed, at which processing requests in the priority queue 103 are processed in preference to processing requests in the normal queue 104, changes depending on the difference in CPU assignment time determined by the difference in thread priority between the priority request processing thread 105 and the normal request processing thread 106.

When the thread priority of the priority request processing thread 105 is lower than that of the normal request processing thread 106, the priority request processing thread 105 is assigned a shorter CPU time than that of the normal request processing thread 106. The processing amount of the priority request processing thread 105 per unit time is smaller than that of the normal request processing thread 106. If the generation amount of priority processing requests per unit time becomes much smaller than half the generation amount of processing requests per unit time that need not be preferentially processed, a processing request in the priority queue 103 is not processed in preference to a processing request in the normal queue 104.

The ratio between the generation amount of priority processing requests per unit time and that of processing requests per unit time that need not be preferentially processed, at which processing requests in the priority queue 103 are processed in preference to processing requests in the normal queue 104, changes depending on the difference in CPU assignment time determined by the difference in thread priority between the priority request processing thread 105 and the normal request processing thread 106.

An application of the first embodiment will be described in detail with reference to the accompanying drawings.

An application to a television/radio video/audio program broadcasting system will be exemplified. The television/radio video/audio program broadcasting system is constituted by an editing apparatus which manages the program frame of each program broadcast through one channel and a CM time frame in the program frame, a producing apparatus which produces sending contents, and a sending apparatus which sends sending data along designated sending schedule information.

The video/audio program broadcasting system is controlled by a sending schedule information map called a playlist. The sending schedule information map is a table which describes information for causing the sending apparatus to correctly send contents produced by the editing and producing apparatuses. More specifically, a given program frame is divided into smaller time frames. The sending start time and sending duration of each time frame, and the attribute value of a content sent within the time frame are set.

The playlist describes the sending start time and sending duration of a time frame within each program, the type of time frame such as a program or CM, and address information of video and audio contents sent within the time frame. The playlist is created by the editing apparatus. The producing apparatus sets video and audio contents to be sent at addresses designated in the playlist. The sending apparatus acquires from the producing apparatus a content at the address designated by the playlist. The sending apparatus performs sending preparation processing of processing the acquired content into sendable data, and sends the prepared sending data at designated sending start time.

Some broadcasting programs may be broadcast by changing their preset sending schedules. This change may target an on-air program or subsequent broadcasting programs. A processing request which requests change of the sending schedule of an on-air program must be processed in preference to a processing request which requests change of the sending schedules of subsequent broadcasting programs. Processing of changing the sending schedule for each program will be called program data change processing.

In some cases, not only the sending schedule of a specific broadcasting program but also the sending schedules of subsequent broadcasting programs must be changed. This processing will be called programming change processing. Programming change processing is required when a game such as a sportscast prolongs or ends early. Programming change processing must be preferentially executed, similar to program data change processing for an on-air program. In either case, change of the sending schedule is transmitted to the sending apparatus by changing the playlist.

Figure 6:
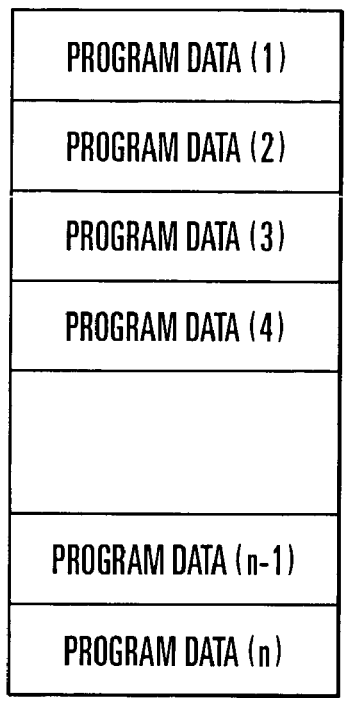
FIG. 6 is a view schematically showing a playlist in a video/audio program broadcasting system.

FIG. 6 schematically shows the playlist. In FIG. 6, program data (1) to (n) describe pieces of sending schedule information about corresponding broadcasting programs. In this embodiment, the data storage device 107 in FIG. 2 stores these pieces of sending schedule information. Each of program data (1) to (n) is one exclusive unit.

The application program 200 corresponds to a broadcasting service application program which issues a sending schedule information change request as a processing request. In sending a processing request, the application program 200 sets the type of processing such as program data change processing or programming change processing in the processing request body 301 (FIG. 4). At the same time, the application program 200 sets changed sending schedule information in program data change processing or programming change processing. Then, the application program 200 generates a processing request 300 in which priority data 303 is added to a header 302. The priority data 303 is a positive integer for program data change processing and programming change processing of an on-air program; otherwise, "0".

The processing request distributor 102 determines whether the processing request is a priority processing request by checking whether the value of the priority data 303 is a positive integer in accordance with a priority rule stored in the priority rule storage unit 101, The processing request distributor 102 stores a priority processing request in the priority queue 103 and a normal processing request in the normal queue 104. Therefore, a processing request concerning program data change processing for an on-air program and a processing request concerning programming change processing are stored in the priority queue 103. A processing request concerning program data change processing for subsequent programs Is stored in the normal queue 104. Programming data change processing for an on-air program and programming change processing are executed in preference to another processing.

When data of an on-air program is, e.g., program data (2) in FIG. 6, program data change processing executed by the normal request processing thread 106 is restricted to processing of program data (3) and subsequent data. Even if a processing request concerning change of program data (2) of an on-air program is generated while the normal request processing thread 106 exclusively locks any one of program data (3) to (n) for the purpose of program data change processing, the priority request processing thread 105 can pursue processing of the processing request without being influenced by the normal request processing thread 106 because of different exclusive units.

Second Embodiment

Figure 7:
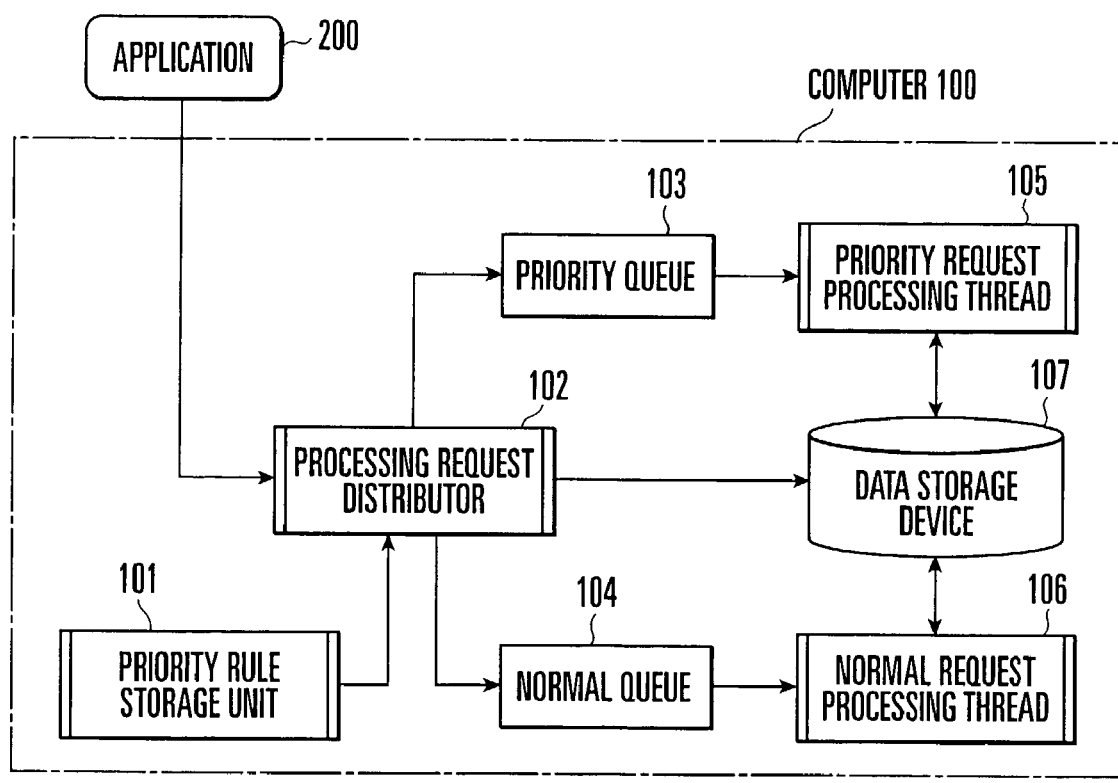
FIG. 7 is a block diagram showing an information processing system according to the second embodiment of the present invention.

The second embodiment of the present invention will be described with reference to FIG. 7. An information processing system according to the second embodiment is different from that of the first embodiment in that a processing request distributor 102 of a computer 100 can refer to a data storage device 107. The data storage device 107 stores the processing results of threads 105 and 106. Since the processing request distributor 102 can refer to the data storage device 107, the distributor 102 can dynamically change how to distribute processing requests in accordance with previous processing results.

Assume that a priority rule stored in a priority rule storage unit 101 is a rule that the priority is set high when priority data 303 is equal to or higher than the threshold $\alpha$ and low when the priority data 303 is lower than the threshold $\alpha$. In this case, the threshold $\alpha$ is a fixed value in the first embodiment. To the contrary, the second embodiment sets the threshold $\alpha$ as a variable which changes depending on the progress of processing in the data storage device 107. The second embodiment can dynamically set, in accordance with previous processing results, the threshold $\alpha$ at which the priority is divided into high and low levels.

An application of the second embodiment will be explained in detail with reference to the accompanying drawings.

An application to a quiz application which processes score data of 10,000 users and generates the user names of top 100 users and a list of scores will be exemplified. In this case, an application program 200 is a quiz application program. The application program 200 sets a user name and score data in a processing request body 301 (FIG. 4) every time the information processing system receives a packet containing data (user name and score data) obtained by making an answer transmitted from a viewer (user) via a communication apparatus such as a portable telephone with respect to a quiz broadcast on a television program. The application program 200 outputs to the processing request distributor 102 a processing request 300 in which the score data is set as priority data 303 of a header 302. This processing is repeated for 10,000 users.

Figure 8A:
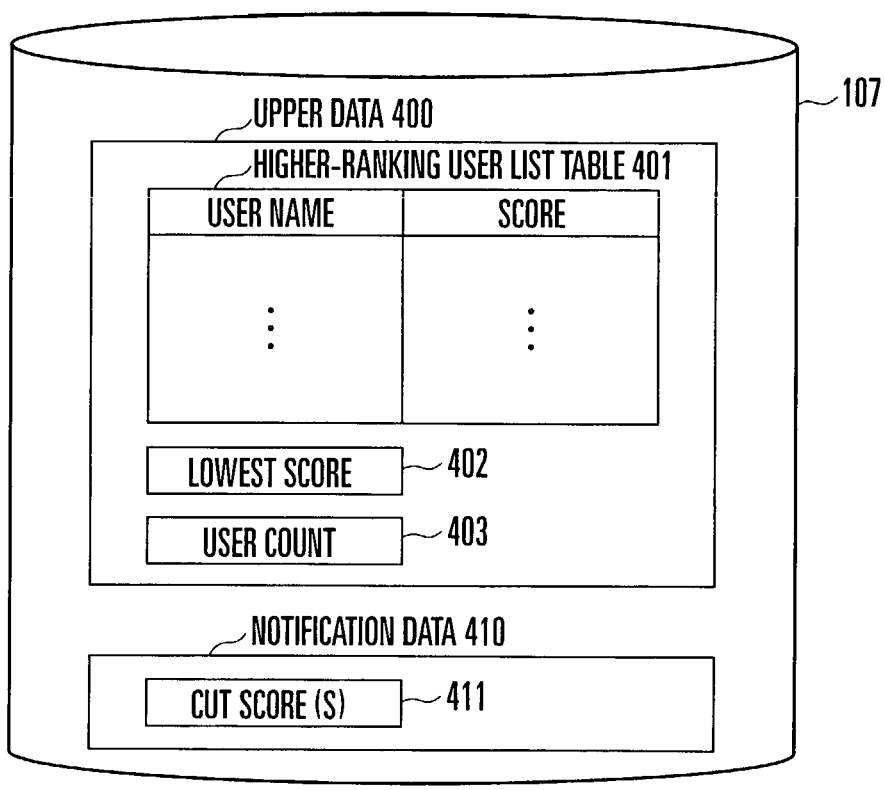
FIGS. 8A to 8C are views showing an example of a data structure stored in a data storage device in an application of the second embodiment.

In the data storage device 107, as shown in FIG. 8A, upper data 400 and notification data 410 are set in independent data areas. The upper data 400 contains a higher-ranking user list table 401 which records the user names and scores of top 100 users, a lowest score 402 among the scores recorded in the higher-ranking user list table 401, and a user count 403 recorded in the higher-ranking user list table 401. The default value of the lowest score 402 is a given value equal to or higher than a perfect score, and the default value of the user count is "0". These default values are properly changed in accordance with update of the higher-ranking user list table 401.

The notification data 410 records a cut score (S) 411 serving as a score for cut. The default value of the cut score 411 is "0" and is appropriately changed in accordance with update of the higher-ranking user list table 401. When the data storage device 107 is to be updated, exclusive control is done for each upper data 400 and each notification data 410. Even if a given user is excluded for update, another user can freely refer to data.

Figure 8B:
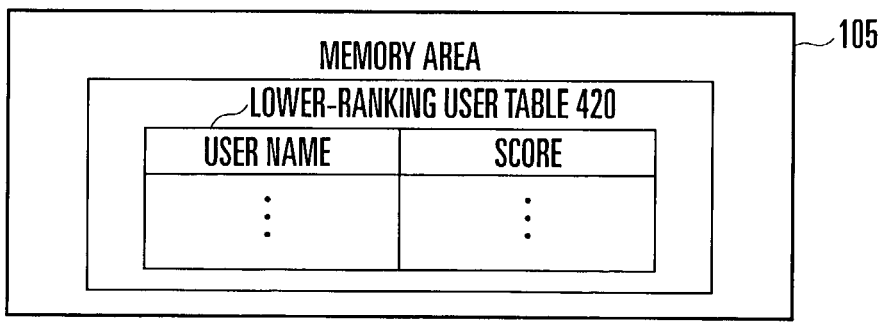
Figure 8C:
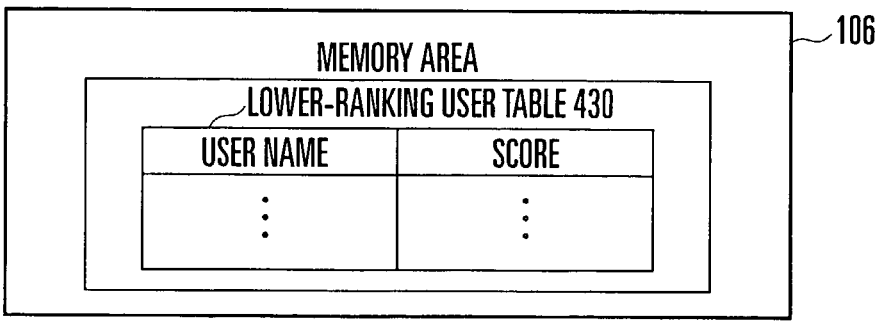

As shown in FIGS. 8B and 8C, the priority request processing thread 105 and normal request processing thread 106 have lower-ranking user tables 420 and 430 set in the memory areas of the threads 105 and 106. The lower-ranking user tables 420 and 430 record the user names and scores of users who do not fall within top 100 users.

Figure 9:
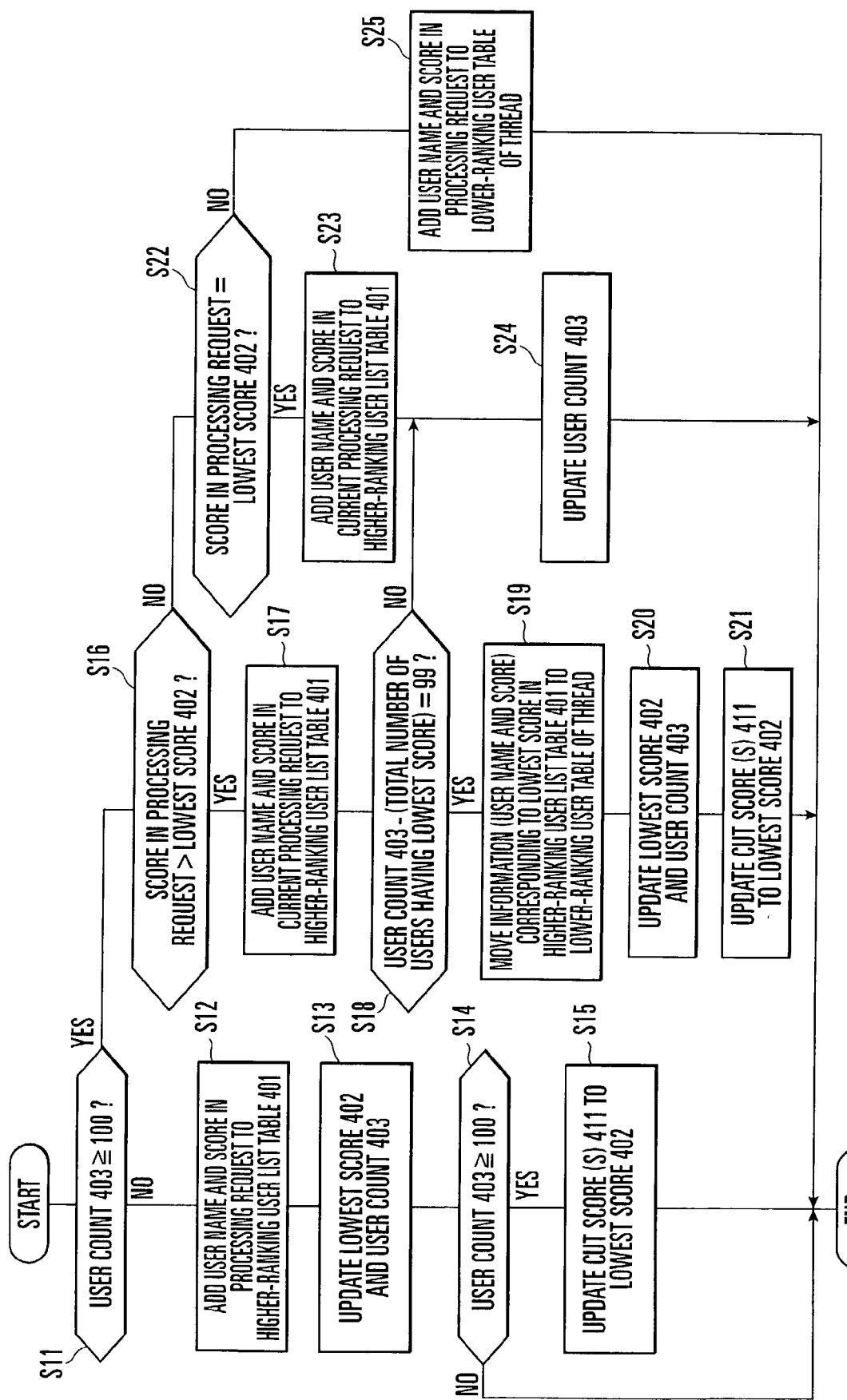
FIG. 9 is a flow chart showing processes performed by priority and normal request processing threads in the application of the second embodiment.

The priority request processing thread 105 and normal request processing thread 106 perform processing shown in FIG. 9 in processing of step S3 (FIG. 3) for processing requests extracted from corresponding queues 103 and 104.

The thread checks whether the user count 403 of the upper data 400 is "100" or more (step S11). If NO in step S11, the thread adds a user name and score in the current processing request to the higher-ranking user list table 401 of the upper data 400 (step S12). The thread increments the user count 403 by one, and if the added user score is lower than the lowest score 402, updates the lowest score 402 to the added user score (step S13). The thread checks whether the user count 403 reaches "100" or more (step S14), and if NO in step S14, ends the current processing. If YES in step S14, the thread updates the cut score 411 of the notification data 410 to the lowest score 402 of the upper data 400 (step S15).

If YES in step S11, the thread compares the score In the current processing request with the lowest score 402 (step S16). If the score is higher than the lowest score 402, the thread adds the user name and score in the current processing request to the higher-ranking user list table 401 (step S17). The thread checks whether the difference calculated by subtracting the total number of users having the lowest score in the higher-ranking user list table 401 from the user count 403 is "99" (step S18). If YES in step S18, the thread moves all pieces of user information (user names and scores) corresponding to the lowest score from the higher-ranking user list table 401 to the lower-ranking user table 420 or 430 of the thread (step S19). Then, the thread updates the lowest score 402 to a new lowest score in the updated higher-ranking user list table 401, and updates the user count 403 to "100" (step S20). The thread updates the cut score 411 to the updated lowest score 402 (step S21). If NO in step S18, the thread increments the user table 430 by one (step S24).

If the score in the current processing request is not higher than the lowest score 402, the thread checks whether this score is equal to the lowest score 402 (step S22). If YES in step S22, the thread adds the user name and score in the current processing request to the higher-ranking user list table 401 (step S23), and increments the user count 403 by one (step S24).

If NO in step S22, the thread adds the user name and score in the current processing request to the lower-ranking user table 420 or 430 of the thread (step S25).

The processing request distributor 102 compares a score represented by the priority data 303 added to the processing request 300 with the cut score 411 stored in the data storage device 107. A processing request 300 having a score lower than the cut score 411 is stored in the normal queue 104. A processing request 300 having a score equal to or higher than the cut score 411 is stored in the priority queue 103.

The operation of this application will be described. Upon reception of a packet containing a user name and score data, the application program 200 stores in the processing request distributor 102 a processing request 300 in which the score data is set in the priority data 303 of the header 302 and the user name and score are set in the processing request body 301. The processing request distributor 102 compares the score represented by the priority data 303 of the processing request 300 with the cut score 411 in the data storage device 107, and determines the priority of the processing request. Since the cut score 411 is set to the default value of "0", the processing request distributor 102 determines at the beginning that all processing requests 300 are priority processing requests, and stores the processing requests 300 in the priority queue 103.

The priority request processing thread 105 sequentially extracts processing requests from the priority queue 103, and executes processing shown in FIG. 9. Since the user count 403 is lower than "100" at the beginning, the thread 105 adds a user name and score in a processing request to the higher-ranking user list table 401 (step S12). The thread 105 updates the lowest score 402 as needed, and increments the user count 403 by one (step S13). After 100 processing requests are processed, the priority request processing thread 105 sets the lowest score as the cut score 411 (step S15).

After the cut score 411 is updated to a given score X other than "0", the processing request distributor 102 stores a processing request 300 having a score lower than the score X in the normal queue 104, and only a processing request 300 having a score higher than the score X in the priority queue 103. Due to the presence of a delay by the priority queue 103, a processing request may be distributed to the priority queue 103 on the basis of an old lower cut score 411. If such a processing request is stored in the priority queue 103, a user name and score in this processing request are recorded in the lower-ranking user table 420 in step S25 because the score of this processing request is lower than the lowest score 402.

For a processing request having a score equal to or higher than the lowest score 402, the priority request processing thread 105 executes the following processing. If a processing request is determined in step S16 to have a score higher than the lowest score 402, the priority request processing thread 105 adds a user name and score in the current processing request to the higher-ranking user list table 401 (step S17). If a user having a lowest score cannot be added to top 100 users in step S18, the priority request processing thread 105 moves the user names and scores of users having the lowest score from the higher-ranking user list table 401 to the lower-ranking user table 420 (step S19). The priority request processing thread 105 updates the lowest score 402 to the lowest score in the updated higher-ranking user list table 401, and updates the user count 403 to 100 (step S20). The priority request processing thread 105 updates the cut score 411 to the updated lowest score 402 (step S21).

If a processing request is determined in step S22 to have the same score as the lowest score 402, the priority request processing thread 105 adds a user name and score in the current processing request to the higher-ranking user list table 401 (step S23), and increments the user count 403 by one (step S24).

On the other hand, the normal request processing thread 106 extracts a processing request from the normal queue 104, and executes processing in FIG. 9. Note that when a processing request is stored in the normal queue 104, the user count 403 is "100" or higher, and a processing request having a score equal to or higher than the lowest score 402 is not stored In the normal queue 104. For this reason, processing executed by the normal request processing thread 106 is only processing (step S25) of recording the user name and score of a processing request in the lower-ranking user table 430 of the thread 106. In this case, the normal request processing thread 106 does not perform update of the upper data 400 and notification data 410 in the data storage device 107, and exclusive locking therefor. The priority request processing thread 105 can, therefore, pursue its own processing without being influenced by processing of the normal request processing thread 106. Processing of recording the user names and scores of top 100 users on the data storage device 107 such as a disk can be efficiently achieved.

Third Embodiment

Figure 10:
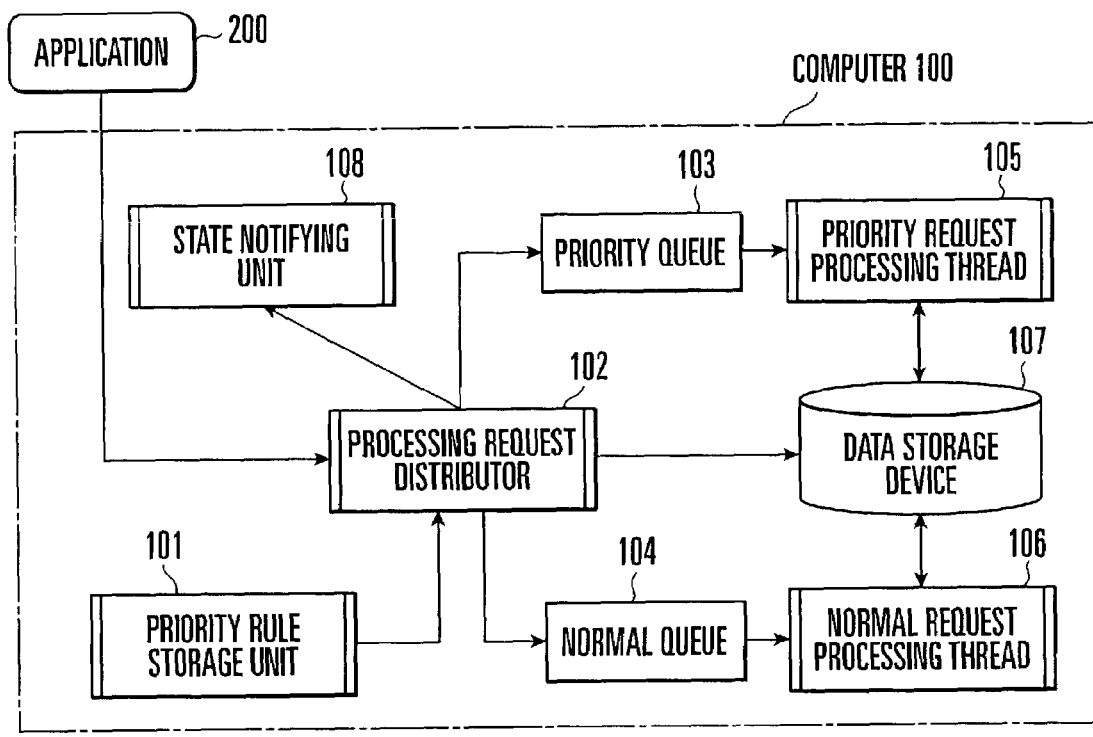
FIG. 10 is a block diagram showing an information processing system according to the third embodiment of the present invention.

The third embodiment of the present invention will be described with reference to FIG. 10. An information processing system according to the third embodiment is different from that of the second embodiment in that a computer 100 comprises a state notifying unit 108 which notifies an application program 200 of arbitrary data as a state notification from a processing request distributor 102.

The state notifying unit 108 is interposed between the processing request distributor 102 and the application program 200. This allows quickly notifying the application program 200 of the result of a processing request stored by the application program 200. For example, in the application of the second embodiment, the application program 200 can be notified of the higher-ranking user list table 401 of top 100 users that is created in the data storage device 107. By the following operation, the higher-ranking user list table 401 can be sent to the application program 200 immediately after the completion of the table 401.

The processing request distributor 102 counts the number of processing requests 300 stored in priority and normal queues 103 and 104. When the count reaches "10,000", the processing request distributor 102 monitors the state of the priority queue 103. The higher-ranking user list table 401 is read out from the data storage device 107 a time taken to process one processing request 300 by a priority request processing thread 105 after no processing request 300 exists in the priority queue 103. The higher-ranking user list table 401 is sent to the application program 200 via the state notifying unit 108. This processing is irrelevant to the number of processing requests accumulated in the normal queue 104. This is because it has already been determined that these processing requests do not fall within the table of top 100 users.

Fourth Embodiment

Figure 11:
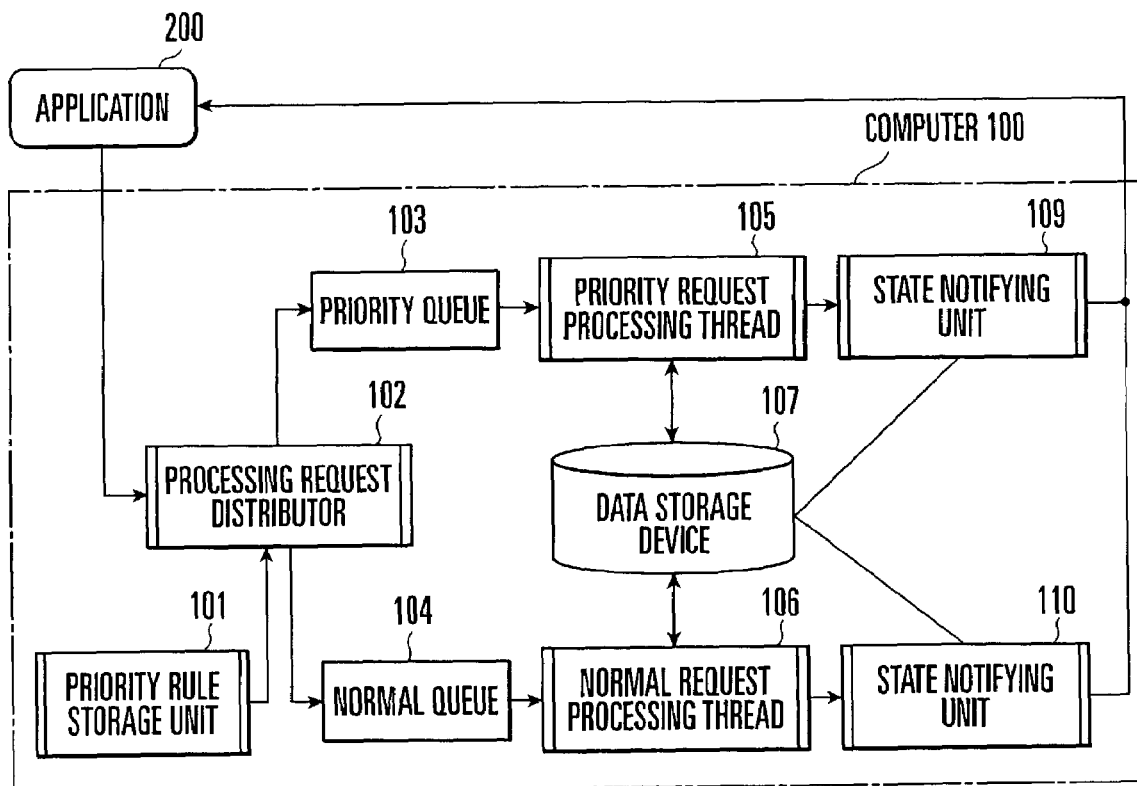
FIG. 11 is a block diagram showing an information processing system according to the fourth embodiment of the present invention.

The fourth embodiment of the present invention will be described with reference to FIG. 11. An information processing system according to the fourth embodiment is different from that of the third embodiment in that a computer 100 comprises state notifying units 109 and 110. The state notifying unit 109 notifies an application program 200 of arbitrary data recorded on a data storage device 107 as a state notification from a priority request processing thread 105. The state notifying unit 110 notifies the application program 200 of arbitrary data recorded on the data storage device 107 as a state notification from a normal request processing thread 106.

The use of the state notifying units 109 and 110 enables notifying the application program 200 independently of the progress of processing a processing request in a priority queue 103 by the priority request processing thread 105 and the progress of processing a processing request in a normal queue 104 by the normal request processing thread 106. For example, in the application of the second embodiment, the priority request processing thread 105 can notify in real time the application program 200 of the contents of a higher-ranking user list table 401 which keeps changing in the data storage device 107. If necessary, the priority request processing thread 105 can also notify the application program 200 of the progress of a lower-ranking user table 420. The normal request processing thread 106 can notify the application program 200 of the progress of a lower-ranking user table 430 via the state notifying unit 110.

Fifth Embodiment

Figure 12:
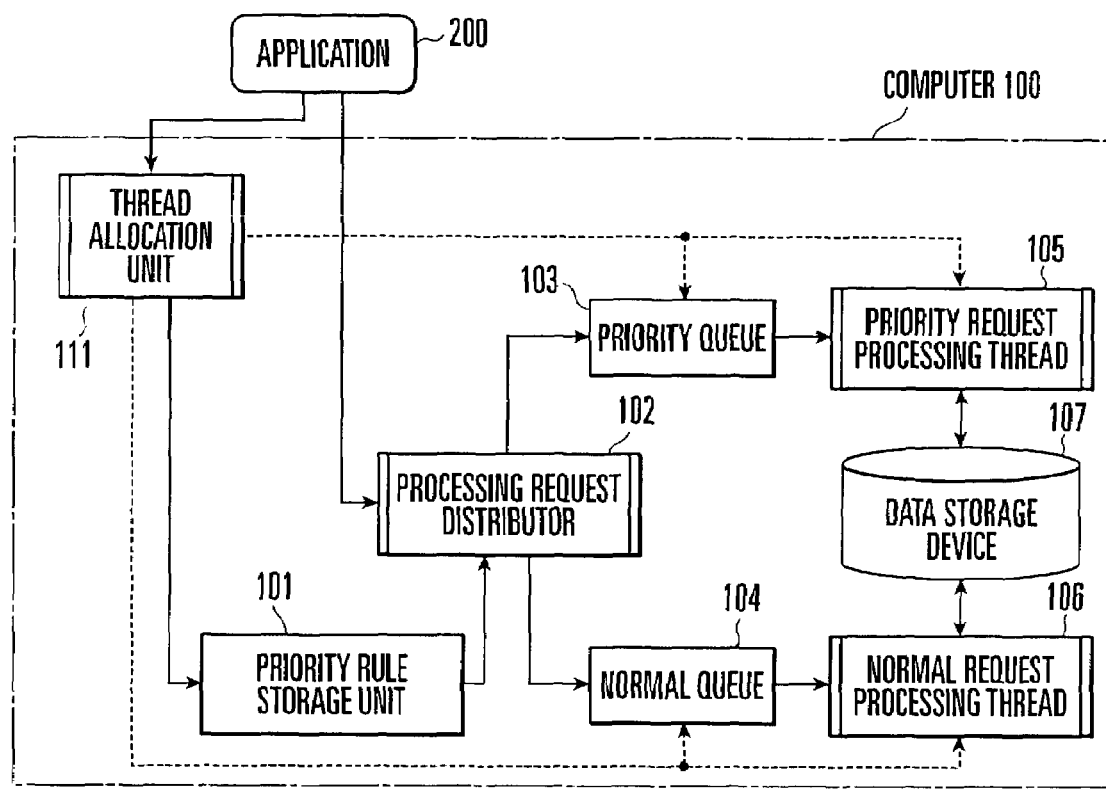
FIG. 12 is a block diagram showing an information processing system according to the fifth embodiment of the present invention.

The fifth embodiment of the present invention will be described with reference to FIG. 12. An information processing system according to the fifth embodiment is different from that of the first embodiment in that a computer 100 comprises a thread allocation unit 111 which generates a queue and corresponding request processing thread in accordance with an instruction from an application program 200, and eliminates a generated queue and corresponding request processing thread in accordance with an instruction from the application program 200.

In generating a pair of queue and thread, the thread allocation unit 111 receives the designation of a "priority/ normal" classification and thread priority from the application program 200. If a "priority" classification is designated, the thread allocation unit 111 generates a priority queue 103 and a priority request processing thread 105 having a designated thread priority. The thread allocation unit 111 sets the location (address) of the priority queue 103 in a priority rule storage unit 101. If a "normal" classification is designated, the thread allocation unit 111 generates a normal queue 104 and a normal request processing thread 106 having a designated thread priority. The thread allocation unit 111 sets the location (address) of the normal queue 104 in the priority rule storage unit 101.

In eliminating a pair of queue and thread, the thread allocation unit 111 receives the designation of a "priority/ normal" classification from the application program 200. If a "priority" classification is designated, the thread allocation unit 111 eliminates the priority queue 103 and priority request processing thread 105, and erases the location (address) of the priority queue 103 in the priority rule storage unit 101. If a "normal" classification is designated, the thread allocation unit 111 eliminates the normal queue 104 and normal request processing thread 106, and erases the location (address) of the normal queue 104 in the priority rule storage unit 101.

The processing request distributor 102 refers to the priority rule storage unit 101 for the addresses of the priority and normal queues 103 and 104, and recognizes queue positions where processing requests input from the application program 200 are to be stored. If only the normal queue 104 exists without any priority queue 103, all processing requests are stored in the normal queue 104. Similarly, when only the priority queue 103 exists without any normal queue 104, all processing requests are stored in the priority queue 103. If a processing request is input in the absence of both the priority and normal queues 103 and 104, an error occurs.

With the thread allocation unit 111, the application program 200 can exploit priority execution control by generating the priority queue 103 and priority request processing thread 105 at the same time as generating the normal queue 104 and normal request processing thread 106. After priority execution control becomes unnecessary, the priority queue 103 and priority request processing thread 105 are eliminated to prevent wasteful use of the resource.

In an application of the first embodiment to the broadcasting service application, when it is apparent that no program change will occur on the air, the application program 200 eliminates the priority queue 103 and priority request processing thread 105 by using the thread allocation unit 111. If it is known that any change will occur during a given on-air program, the application program 200 generates the priority queue 103 and priority request processing thread 105 by similarly using the thread allocation unit 111. Priority execution can therefore be used, as needed. At the end of processing, the application program 200 can eliminate the priority queue 103, priority request processing thread 105, normal queue 104, and normal request processing thread 106 by using the thread allocation unit 111.

Sixth Embodiment

Figure 13:
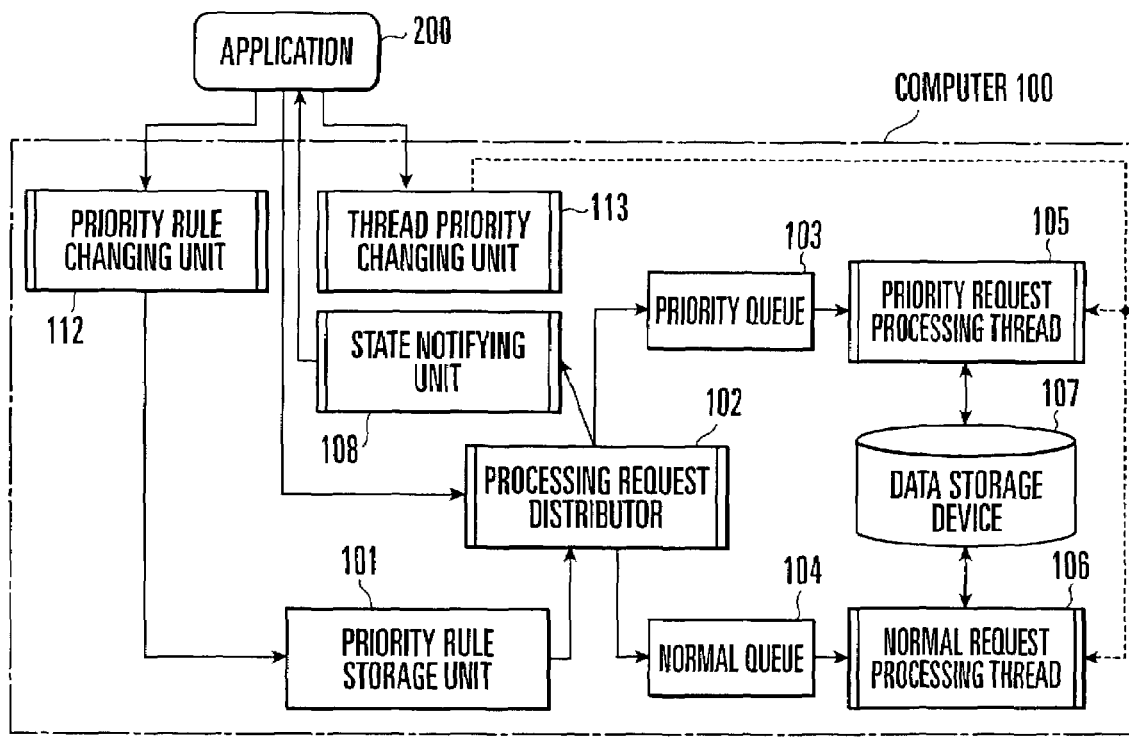
FIG. 13 is a block diagram showing an information processing system according to the sixth embodiment of the present invention.

The sixth embodiment of the present invention will be described with reference to FIG. 13. The sixth embodiment is different from the second embodiment in that an information processing system comprises a priority rule changing unit 112, thread priority changing unit 113, and state notifying unit 108. The priority rule changing unit 112 changes a priority rule in a priority rule storage unit 101 in accordance with an instruction from an application program 200. The thread priority changing unit 113 changes the thread priorities of a priority request processing thread 105 and normal request processing thread 106 in accordance with an instruction from an application program 200. The state notifying unit 108 notifies the application program 200 of arbitrary data as a state notification from a processing request distributor 102.

In changing the priority rule, the priority rule changing unit 112 receives a changed priority rule from the application program 200, and rewrites a priority rule stored in the priority rule storage unit 101 to the received priority rule.

In changing the thread priority, the thread priority changing unit 113 receives a "priority/normal" classification and a changed thread priority from the application program 200. The thread priority changing unit 113 changes the thread priority of the priority request processing thread 105 or normal request processing thread 106 designated by the classification to the designated priority.

The state notifying unit 108 notifies the application program 200 of arbitrary data such as the states of normal and priority queues 103 and 104 or data stored in a data storage device 107 from the processing request distributor 102.

According to the sixth embodiment, the application program 200 can dynamically switch various priority execution control methods during system operation.

(1) Priority execution control which sets the thread priority of the priority request processing thread 105 lower than that of the normal request processing thread 106.

(2) Priority execution control which sets the thread priority of the priority request processing thread 105 equal to that of the normal request processing thread 106.

(3) Priority execution control which sets the thread priority of the priority request processing thread 105 higher than that of the normal request processing thread 106.

Priority rules used in priority execution control types (1) to (3) can be dynamically switched during system operation.

An application of the sixth embodiment will be explained. In this case, a broadcasting service application will be exemplified, similar to the application of the first embodiment.

Assume that it is known in advance that only the broadcasting program of program data (3) out of program data (1) to (n) in FIG. 6 is frequently changed on the air, and the remaining program data (1), (2), and (4) to (n) are not or hardly changed on the air. During the on-air program of program data except for program data (3), program data change processing and programming change processing concerning the on-air program are performed in preference to another processing. In contrast, during the on-air program of program data (3), change processing of program data (3) including programming change processing must be executed in preference to another processing.

In this case, the application program 200 sets the thread priority of the priority request processing thread 105 equal to or lower than that of the normal request processing thread 106 by using the thread priority changing unit 113 until the program of program data (3) is broadcast. The application program 200 sets a positive integer as priority data 303 for program data change processing and programming change processing with respect to program data of an on-air program. Along with this, the priority rule changing unit 112 sets in the priority rule storage unit 101 a priority rule that the priority is set high if the value of the priority data 303 is a positive integer; otherwise, low.

Of processing requests output from the application program 200 to the processing request distributor 102, a program data change processing request and programming change processing request for program data of an on-air program are supplied to the priority request processing thread 105 via the priority queue 103. Normal processing requests are supplied to the normal request processing thread 106 via the normal queue 104. As described in the first embodiment, when the generation amount of priority processing requests is much smaller than that of normal processing requests, priority processing requests can be preferentially processed even with the thread priority of the priority request processing thread 105 equal to or lower than that of the normal request processing thread 106. In this example, a program data change processing request and programming change processing request for an on-air program can be processed in preference to other processing requests.

On the other hand, setting the thread priority of the priority request processing thread 105 higher than that of the normal request processing thread 106 for a small generation amount of priority processing requests unnecessarily obstructs processing of the normal request processing thread 106. To prevent this, the thread priority of the priority request processing thread 105 is set equal to or lower than that of the normal request processing thread 106. The performance of the normal request processing thread 106 can be relatively improved, and even a large generation amount of processing requests which need not be preferentially processed can be quickly processed.

Before the program of program data (3) is on the air, the application program 200 sets the thread priority of the priority request processing thread 105 higher than that of the normal request processing thread 106 by using the thread priority changing unit 113. The application program 200 uses the priority rule changing unit 112 to set in the priority rule storage unit 101 a priority rule that the priority is set high if the value of the priority data 303 is a positive integer and the type of processing is program data change processing; otherwise, low.

With this setting, of processing requests output from the application program 200 to the processing request distributor 102, only a processing request for program data change processing of an on-air program is supplied to the priority request processing thread 105 via the priority queue 103. Normal processing requests including a programming change request are supplied to the normal request processing thread 106 via the normal queue 104. Thus, only the processing request for program data change processing of the on-air program can be preferentially executed.

After the program of program data (3) is off the air, the application program 200 returns the thread priority and priority rule to original ones. That is, the application program 200 sets the thread priority of the priority request processing thread 105 equal to or lower than that of the normal request processing thread 106 by using the thread priority changing unit 113. Along with this, the priority rule changing unit 112 sets in the priority rule storage unit 101 a priority rule that the priority is set high if the value of the priority data 303 is a positive integer; otherwise, low.

The application program 200 periodically collects the states of the priority and normal queues 103 and 104 from the processing request distributor 102 via the state notifying unit 108. If any problem occurs with the current thread priority and priority rule, the thread priority and priority rule are properly changed by the thread priority changing unit 113 and priority rule changing unit 112, respectively. For example, it is turned out that the generation amount of change requests for on-air program data (1) and (2) increases against the estimation and processing requests are accumulated in the priority queue 103. In this case, the thread priority of the priority request processing thread 105 is increased, or the priority rule is changed to change the priority to a high level for only change requests for on-air program data.

Seventh Embodiment

Figure 14:
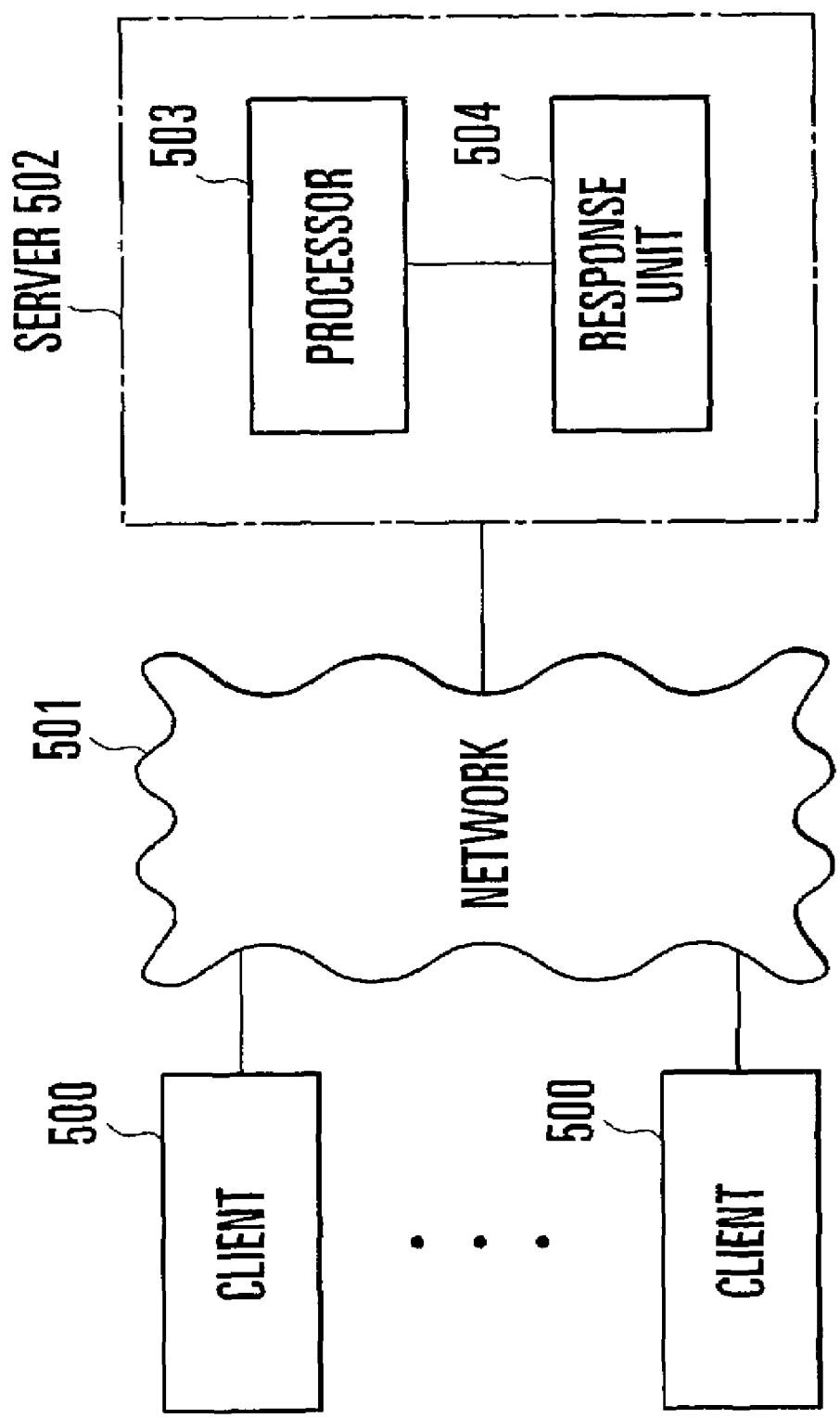
FIG. 14 is a block diagram showing an information processing system according to the seventh embodiment of the present invention.

The seventh embodiment of the present invention will be described with reference to FIG. 14. In the seventh embodiment, the present invention is applied to a processor 503 which processes a processing request sent from a client 500 to a server 502 via a network 501, and a response unit 504 which sends back a response result obtained by the processor 503 to the requesting client 500 via the network 501 in a client-server information processing system in which the client 500 and server 502 are connected via the network 501.

The processor 503 has a function of performing priority execution control described in the first to sixth embodiments for processing of a processing request from the client 500. The response unit 504 has a function of performing priority execution control described in the first to sixth embodiments for processing of sending back a response result generated by the processor 503 to the client 500.

Figure 15:
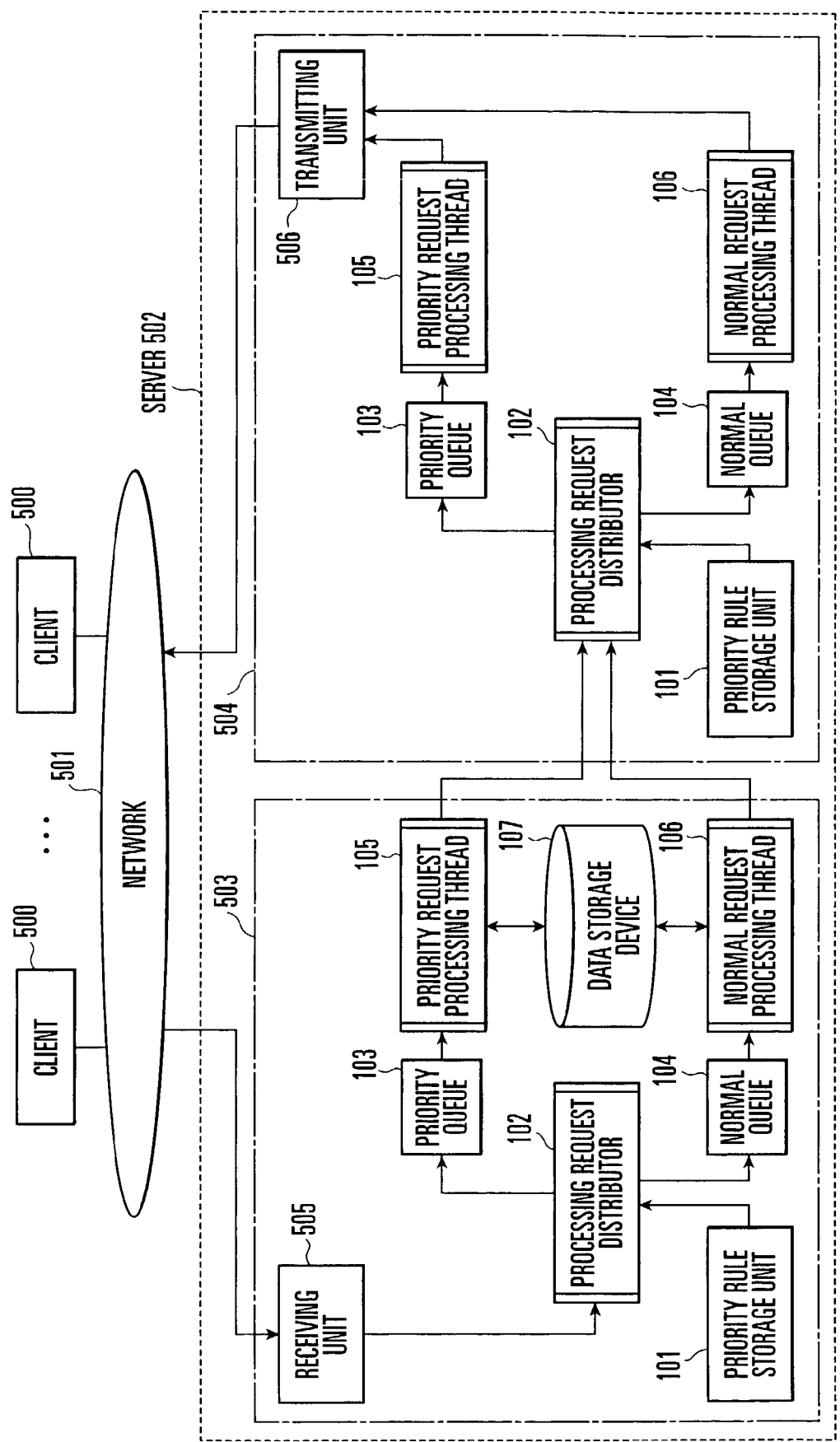
FIG. 15 is a block diagram showing in more detail the information processing system shown in FIG. 14.

FIG. 15 shows an application of priority execution control in the first embodiment to the processor 503 and response unit 504.

Referring to FIG. 15, a receiving unit 505 of the processor 503 receives a processing request from the client 500 via the network 501, and transmits the processing request to a processing request distributor 102. The processing request distributor 102 determines the processing priority of the processing request in accordance with a priority rule in a priority rule storage unit 101. The processing request distributor 102 stores the processing request in either a priority queue 103 or normal queue 104. An example of the priority rule is a rule including a priority corresponding to the client name of each client 500 and a threshold for dividing the priority into high and low levels. In this case, the processing request distributor 102 acquires from the priority rule a priority corresponding to the client name of the processing request source, compares the priority with the threshold, and distributes the processing request to the priority queue 103 or normal queue 104.

As another method, the client 500 adds to a processing request a header in which priority data representing the processing priority is set, and prepares as thee priority rule a rule used to determine a high/low priority in accordance with the priority data value. The processing request distributor 102 can also distribute the processing request to the priority queue 103 or normal queue 104 on the basis of the priority data and priority rule set in the header.

A priority request processing thread 105 and normal request processing thread 106 of the processor 503 extract processing requests from the priority queue 103 and normal queue 104. The threads 105 and 106 refer to and update a data storage device 107 such as a database, and process the processing requests. The threads 105 and 106 output, to the processing request distributor 102 of the response unit 504, response processing requests of sending back processing results to the client 500.

The processing request distributor 102 determines the priority of a response processing request transferred from the processor 503 on the basis of the priority rule set in the priority rule storage unit 101 of the response unit 504. As a result of determination, a processing request which should be preferentially processed is stored in the priority queue 103, and a normal processing request is stored in the normal queue 104. An example of the priority rule is a rule including a priority corresponding to the client name of each client 500 and a threshold for dividing the priority into high and low levels. In this case, the processing request distributor 102 acquires from the priority rule a priority corresponding to the client name of the processing request source, compares the priority with the threshold, and distributes the processing request to the priority queue 103 or normal queue 104.

As another priority rule, there is conceivable a rule including a priority corresponding to the type of response result and a threshold for dividing the priority into high and low levels. In this case, the threads 105 and 106 of the response unit 504 add, to response result processing requests, headers in which priorities corresponding to the types of response results are set. The processing request distributor 102 in the response unit 504 distributes a processing request to the priority queue 103 or normal queue 104 on the basis of the priority set in the header and the priority rule. As an example of setting the priority in accordance with the type of response result, the priority of an error response which notifies the client 500 that any error occurs, failing to correctly process the processing request, is set higher than that of a normal response.

Eighth Embodiment

Figure 16:
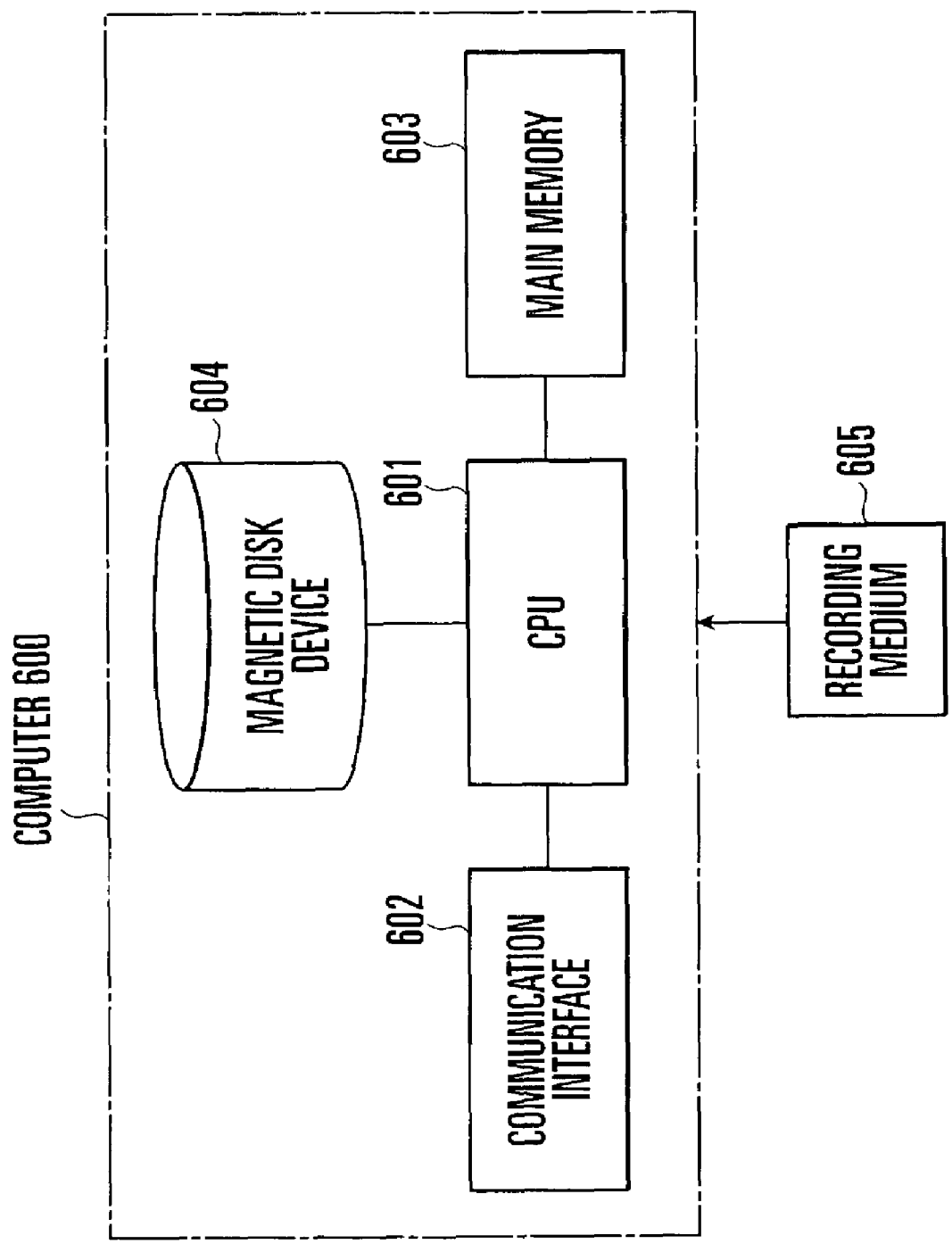
FIG. 16 is a block diagram showing an information processing system according to the eighth embodiment of the present invention.

The eighth embodiment of the present invention will be described with reference to FIG. 16. The eighth embodiment comprises a recording medium 605, and a computer 600 which is constituted by a CPU 601, a communication interface 602 connected to the CPU 601, a main memory 603, and a magnetic disk device 604. The recording medium 605 is a mechanically readable recording medium such as a semiconductor memory, CD-ROM, or magnetic disk, and records a priority execution control program. The recorded priority execution control program is read by the computer 600 to control the operation of the computer 600. As a result, the priority execution control program realizes on the computer 600 a functional unit necessary for priority execution control in the first to seventh embodiments described above.

As has been described above, according to the present invention, a processing request is stored in either of priority and normal queues in accordance with the processing priority. A processing request stored in the priority queue is extracted and processed by a dedicated priority processor. This arrangement enables processing a priority processing request as quickly as possible.

The priority queue and corresponding thread can be dynamically generated/eliminated to prevent wasteful use of the resource. Priority execution control which ensures the resource only if necessary can be achieved.

Since the thread priority of a thread corresponding to each queue can be dynamically changed, flexible control corresponding to the difference between priority and normal processing requests can be done.

The priority rule referred to for priority determination in distributing processing requests to the priority and normal queues can be dynamically changed. The classification of priority and normal processing requests can be dynamically changed to realize flexible control.

What is claimed is:

1. A priority execution control method in an information processing system, comprising the steps of:

storing a processing request in either of a priority queue and a normal queue in accordance with processing priority and a generation amount of the processing request per unit time, wherein the generation amount of the processing request per unit time is a ratio between a generation amount of previously priority processing request and that of previously normal processing request per unit time;

extracting and processing a processing request, stored in the priority queue, by a priority processor which only processes a processing request stored in the priority queue; and extracting and processing a processing request, stored in the normal queue, by a normal processor which only processes a processing request stored in the normal queue, wherein the priority processor and the normal processor include a priority processing thread and a normal processing thread which operate parallel to each other on a computer, and the method further comprising setting thread priority of the priority processing thread equal; to thread priority of the normal processing thread prior to storing the processing request.

2. A method according to claim 1, further comprising the step of dynamically changing at least one of thread priorities of the priority and normal processing threads.

3. A method according to claim 1, wherein the storing step comprises the step of determining the priority by referring to a preset priority rule.

4. A method according to claim 3, further comprising the step of dynamically changing the preset priority rule.

5. A method according to claim 3, wherein the determination of priority also comprises referring to a value of priority data, where the value of priority data is contained in a header of the processing request.

6. A method according to claim 1, further comprising the step of notifying a processing request source of a processing result of a processing request.

7. A method according to claim 1, further comprising the step of notifying a processing request source of at least one of a result of processing a processing request by the priority processing thread and a result of processing a processing request by the normal processing thread.

8. A method according to claim 1, further comprising the steps of:
dynamically generating a pair of the priority queue and priority processing thread; and
dynamically eliminating the generated pair of the priority queue and priority processing thread.

9. A method according to claim 1, wherein the method further comprises the steps of:
processing a processing request from a client to generate a response result in a processor arranged in a server connected to the client via a network;
sending back the response result generated by the processor from a response unit arranged in the server to the requesting client; and
the storing step, the step of processing by the priority processor, and the step of processing by the normal processor are executed in at least one of the processor and the response unit.

10. A priority execution control apparatus in an information processing system, comprising:
a priority queue and a normal queue;
distribution means for storing a processing request in either of said priority queue and said normal queue in accordance with processing priority and a generation amount of the processing request per unit time, wherein the generation amount of the processing request per unit time is a ratio between a generation amount of previously priority processing request and that of previously normal processing request per unit time;

priority processing means, arranged in correspondence with said priority queue, for only extracting and processing a processing request stored in said priority queue; and normal processing means, arranged in correspondence with said normal queue, for only extracting and processing a processing request stored in said normal queue, wherein said priority processing means and said normal processing means include a priority processing thread and a normal processing thread which operate parallel to each other on a computer, and wherein thread priority of said priority processing thread is set equal to thread priority of said normal processing thread.

11. An apparatus according to claim 10, further comprising thread priority changing means for dynamically changing thread priority of said priority processing thread or said normal processing thread.

12. An apparatus according to claim 10, further comprising priority rule storage means for storing a priority rule referred to by said distribution means.

13. An apparatus according to claim 12, further comprising priority rule changing means for dynamically changing the priority rule stored in said priority rule storage means.

14. An apparatus according to claim 10, further comprising state notifying means for notifying a processing request source of a processing result of a processing request.

15. An apparatus according to claim 10, further comprising state notifying means for notifying a processing request source of at least one of a result of processing a processing request by said priority processing thread and a result of processing a processing request by said normal processing thread.

16. An apparatus according to claim 10, further comprising thread allocation means for dynamically generating a pair of said priority queue and priority processing thread, and dynamically eliminating the generated pair of said priority queue and priority processing thread.

17. An apparatus according to claim 10, wherein the apparatus further comprises:
processing means, arranged in a server connected to a client via a network, for processing a processing request to generate a response result;
response means, arranged in the server, for sending back the response result generated by said processing means to the requesting client; and
said priority queue, said normal queue, said distribution means, said priority processing means, and said normal processing means are arranged in at least one of said processing means and said response means.

18. A computer readable recording medium, which records a program for causing a computer to execute procedures of:
storing a processing request in either of a priority queue and a normal queue in accordance with processing priority and a generation amount of the processing request per unit time, wherein the generation amount of the processing request per unit time is a ratio between a generation amount of previously priority processing request and that of previously normal processing request per unit time;

extracting and processing a processing request, stored in the priority queue, by a priority processor which only processes a processing request stored in the priority queue; and extracting and processing a processing request, stored in the normal queue, by a normal processor which only processes a processing request stored in the normal queue, wherein the priority processor and the normal processor include a priority processing thread and a normal processing thread which operate parallel to each other on a computer, and wherein thread priority of the priority processing thread is set equal to thread priority of the normal processing thread.

19. A medium according to claim 18, wherein the program further comprises a procedure of dynamically changing at least one of thread priorities of the priority and normal processing threads.

20. A medium according to claim 18, wherein the storing procedure comprises a procedure of determining the priority by referring to a preset priority rule.

21. A medium according to claim 20, wherein the program further comprises a procedure of dynamically changing the priority rule.

22. A medium according to claim 18, wherein the program further comprises a procedure of notifying a processing request source of a processing result of a processing request.

23. A medium according to claim 18, wherein the program further comprises a procedure of notifying a processing request source of at least one of a result of processing a processing request by the priority processing thread and a result of processing a processing request by the normal processing thread.

24. A medium according to claim 18, wherein the program further comprises procedures of:

dynamically generating a pair of the priority queue and priority processing thread; and dynamically eliminating the generated pair of the priority queue and priority processing thread.

25. A medium according to claim 18, wherein the program further comprises procedures of:

processing a processing request from a client to generate a response result in a processor arranged in a server connected to the client via a network;

sending back the response result generated by the processor from a response unit arranged in the server to the requesting client; and the storing procedure, the procedure of processing by the priority processor, and the procedure of processing by the normal processor are executed in at least one of the processor and the response unit.

* * * * *